(12) United States Patent
Inomata et al.

(10) Patent No.: US 8,130,264 B2
(45) Date of Patent: Mar. 6, 2012

(54) MAGNIFICATION OBSERVATION APPARATUS AND METHOD FOR CREATING HIGH TONE IMAGE FILE

(75) Inventors: Masahiro Inomata, Osaka (JP); Kang Woobum, Osaka (JP)

(73) Assignee: Keyence Corporation, Osaka (JP)

( * ) Notice: Subject to any disclaimer, the term of this patent is extended or adjusted under 35 U.S.C. 154(b) by 975 days.

(21) Appl. No.: 12/115,003

(22) Filed: May 5, 2008

(65) Prior Publication Data
US 2008/0297596 A1    Dec. 4, 2008

(30) Foreign Application Priority Data

Jun. 1, 2007   (JP) .................................. 2007-146785

(51) Int. Cl.
*A61B 1/04*    (2006.01)
*A61B 1/06*    (2006.01)
*H04N 7/18*    (2006.01)
*H04N 9/68*    (2006.01)

(52) U.S. Cl. .............. 348/68; 348/69; 348/70; 348/131; 348/132; 348/235

(58) Field of Classification Search .................. 348/68, 348/69, 70, 131, 132, 235
See application file for complete search history.

(56) References Cited

U.S. PATENT DOCUMENTS

| | | | |
|---|---|---|---|
| 6,301,393 B1* | 10/2001 | Spaulding et al. | 382/240 |
| 7,146,059 B1* | 12/2006 | Durand et al. | 382/260 |
| 7,283,299 B2 | 10/2007 | Inomata | |
| 7,308,128 B2 | 12/2007 | Inomata | |
| 7,447,376 B2* | 11/2008 | Shinbata | 382/254 |
| 2005/0104900 A1* | 5/2005 | Toyama et al. | 345/629 |
| 2005/0243176 A1* | 11/2005 | Wu et al. | 348/207.1 |
| 2008/0131016 A1* | 6/2008 | Kokemohr | 382/254 |
| 2008/0192819 A1* | 8/2008 | Ward et al. | 375/240.02 |
| 2008/0310501 A1* | 12/2008 | Ward et al. | 375/240.02 |

FOREIGN PATENT DOCUMENTS

| | | |
|---|---|---|
| JP | 01-315881 | 12/1989 |
| JP | 08-214306 | 8/1996 |
| JP | 2002-135648 | 5/2002 |
| JP | 2002-223387 | 9/2002 |
| JP | 2002-305684 | 10/2002 |
| JP | 2006-067409 | 3/2006 |

* cited by examiner

*Primary Examiner* — Karen Tang
(74) *Attorney, Agent, or Firm* — Kilyk & Bowersox, P.L.L.C.

(57) ABSTRACT

A high tone image is saved in a versatile image file format to enhance usability. There are provided an imaging unit that images an original image having a predetermined dynamic range, which is a ratio between minimum luminance and maximum luminance; a synthesized image generating part that generates a synthesized image data that is higher in tone than a tone width of the original image by synthesizing a plurality of original images imaged under different imaging conditions at the same observation position; a display unit that displays the images imaged by the imaging unit; a tone conversion part that converts the synthesized image data generated by the synthesized image generating part to low tone image data having a tone width capable of being displayed on the display unit; and a tone data saving part that generates a high tone data-attached display file including a high tone image region for saving the synthesized image data serving as a basis as an image file for saving the low tone image data.

17 Claims, 28 Drawing Sheets

FIG. 13

S1301: Temporarily photograph while changing shutter speed

S1302: Saturation exists in all images?

- YES → S1303: Dynamic range widening photography
- NO → S1304: Resolution enhancing photography

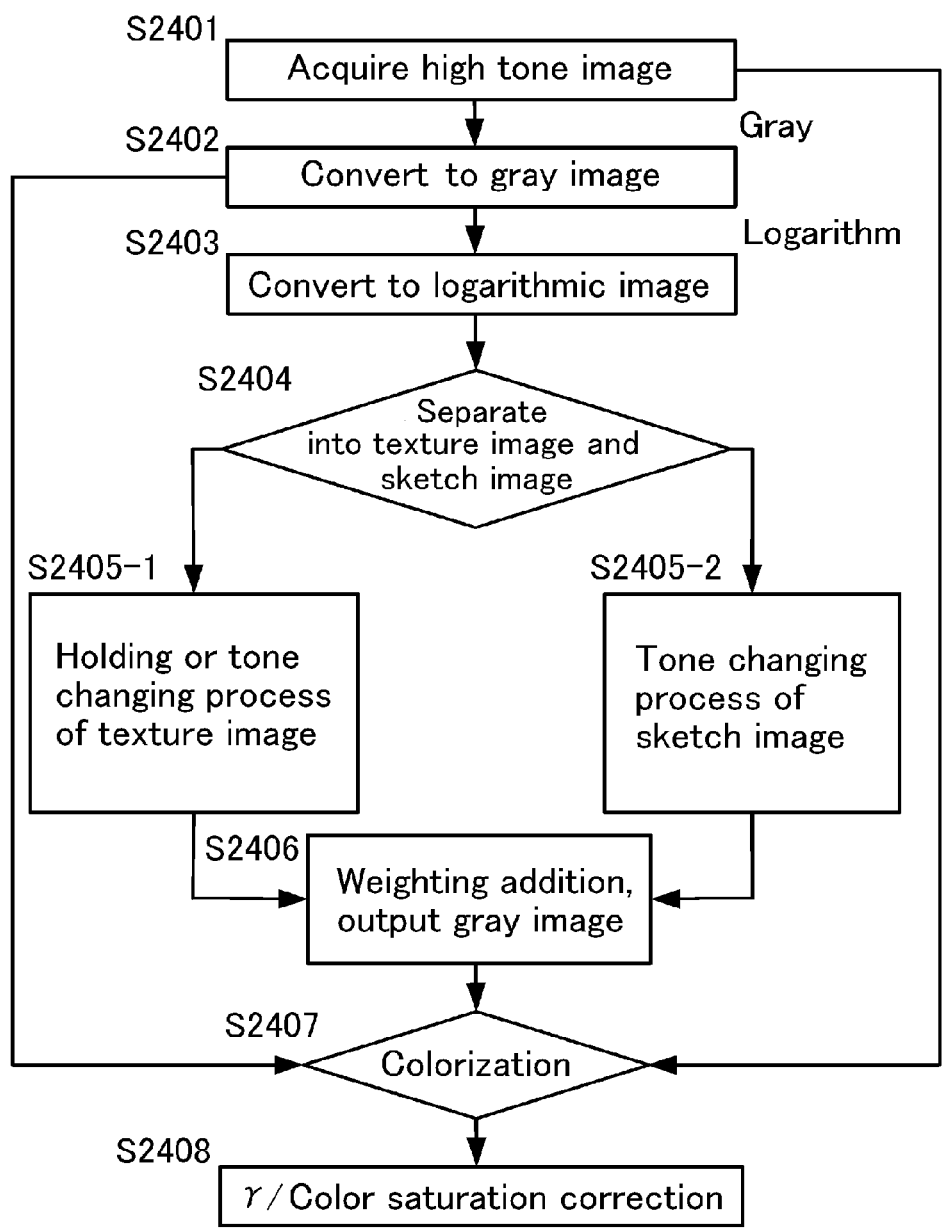

MAGNIFICATION OBSERVATION APPARATUS AND METHOD FOR CREATING HIGH TONE IMAGE FILE

The present application claims priority from Japanese Patent Application No. 2007-146785, filed Jun. 1, 2007, which is incorporated herein by reference.

BACKGROUND OF THE INVENTION

1. Field of the Invention

The present invention relates to a magnification observation apparatus such as a digital microscope and a microscope that images and displays a magnified image and a method for creating a high tone image file.

2. Description of the Relating Art

A magnification observation apparatus that magnifies and displays a subject such as a sample including a minuscule object and a workpiece utilizes an optical microscope and digital microscope using an optical lens, and the like. The digital microscope receives reflected light or transmitted light from an observation target fixed at an observation target fixing unit entering through an optical system with a light receiving device such as a CCD, which electrically reads the light for every pixel arranged two-dimensionally, and displays the electrically read image on a display unit such as a display (e.g., see Japanese Laid-Open Patent Publication No. 2002-135648).

The sensitivity region of the light receiving device such as a CCD is limited to a particular range, whereas the sensitivity range of a human eye is wider. Thus, the range that can be represented (dynamic range) of the image imaged with the CCD is limited compared to the human eye. For instance, the dynamic range is eight bits in a general JPEG image. In this case, if the tone of the image to be imaged exceeds such a range, saturation occurs, thereby causing underexposure, overexposure, halation, and the like. In order to solve such problems, used is a high dynamic range image (hereinafter referred to as "HDR image") in which a plurality of low tone images are imaged with the dynamic range of the luminance region changed is synthesized to obtain a high tone image. The HDR image is obtained by synthesizing a plurality of images at different levels of exposure of the same subject and integrating the darkest shadow (black) to an extremely bright highlight (white) into one HDR image in a wide dynamic range. For instance, a plurality of eight bit images is synthesized to generate a high tone HDR image of sixteen bits or thirty-two bits, and such an image is saved. For example, overexposure occurs at the metal portion in the image shown in FIG. 1, and underexposure occurs in the image shown in FIG. 2. When such images are synthesized, the HDR image as shown in FIG. 3 can be generated. The portions of overexposure and underexposure in the original image are clearly represented in the HDR image of FIG. 3.

When displaying the HDR image synthesized in the above manner on a monitor and the like, tone conversion (tone mapping) needs to be performed to a color range that can be displayed on the monitor, that is, a low dynamic range. Since only 16.77 million colors can be represented in twenty-four bit color, and only 256 colors in the case of eight bits in a general personal computer, the HDR image of thirty-two bits is handled as twenty-four bits or eight bits through tone mapping.

The file format for saving high tone image data such as the HDR image includes thirty-two bits floating point TIFF, log Yuv which obtains Yuv data by taking the logarithm of a synthesized image and converting it to a whole number, and Open EXR using the sixteen bits floating point, each of which is a uncompressed or lossless compression format.

[Patent document 1] Japanese Laid-Open Patent Publication No. 2002-135648

[Patent document 2] Japanese Laid-Open Patent Publication No. 2002-223387

However, since such image file formats are not versatile, such formats cannot be displayed in most commercially available general purpose image display programs. Furthermore, the data size is large since the lossy compression technique such as JPEG is not used. In this regard, a technique of introducing JPEG, JPEG 2000, or the like to perform data compression has been proposed, but it is still difficult to use since the file format is not a general file format such as TIFF and Open EXR. Moreover, when tone-converting a high tone image to a low tone image and displaying the same on a monitor and the like, image processing, such as enhancement of fine patterns (textures) in the high tone image, is sometimes performed. In this case, the texture enhancement process needs to be performed after extracting texture components of the high tone image from the HDR image. Specifically, the texture extracting process is performed after once reading the file from the hard disc drive of a computer. A significant amount of time is required from opening the file to actually displaying the file on the monitor, as a great amount of calculation is required for such an extraction task. Not limited to the texture enhancement process, a great number of drawing parameters need to be set when drawing a high tone image. Such drawing parameters can be automatically or manually set in tone conversion, but conventionally, the user needs to manage the records by, e.g., taking notes on what drawing parameter is set for which high tone image, which is a very cumbersome task.

SUMMARY OF THE INVENTION

The present invention aims at solving the above problems. It is a main object of the present invention to provide a magnification observation apparatus that saves a high tone image in a general purpose image file format to enhance usability, and a method for creating a high tone image file.

In order to achieve the above object, a magnification observation apparatus according to the present invention relates to a magnification observation apparatus capable of displaying an image obtained by imaging a sample to be imaged according to a set imaging condition, the magnification observation apparatus including: an imaging condition setting part that sets at least an exposure time as the imaging condition when imaging an original image in an imaging unit; the imaging unit that images the original image having a predetermined dynamic range, which is a ratio between minimum luminance and maximum luminance, according to the imaging condition set in the imaging condition setting part with respect to an observation position of the sample; a synthesized image generating part that generates synthesized image data that is higher in tone than a tone width of the original image by synthesizing a plurality of original images imaged under different imaging conditions at the same observation position; a display unit that displays the images imaged by the imaging unit; a tone conversion part that converts the synthesized image data generated in the synthesized image generating part to low tone image data having a tone width capable of being displayed on the display unit; and a tone data saving part that generates high tone data-attached display file including a high tone image region for saving the synthesized image data serving as a basis as an image file for saving the low tone image data. Therefore, the low tone image is saved in the image data file so as to be handled in a general image display program and the like, and the synthesized image data serving as a basis of tone conversion can also be saved and managed, whereby not only the low tone image but the synthesized image data serving as the basis of the low tone image can be handled through the use of a dedicated image program, and the low tone image can be updated, replaced, and the like as necessary.

BRIEF DESCRIPTION OF THE DRAWINGS

FIG. 11 is an image showing a synthesized image in which FIG. 10 is imaged in a resolution enhancing photography mode;

FIG. 13 is a flowchart showing method 2 of automatically selecting the synthesized image photography mode;

FIG. 23 is a flowchart showing a procedure for tone-converting a high tone image to a low tone image;

DETAILED DESCRIPTION OF THE PREFERRED EMBODIMENTS

Figure 1:
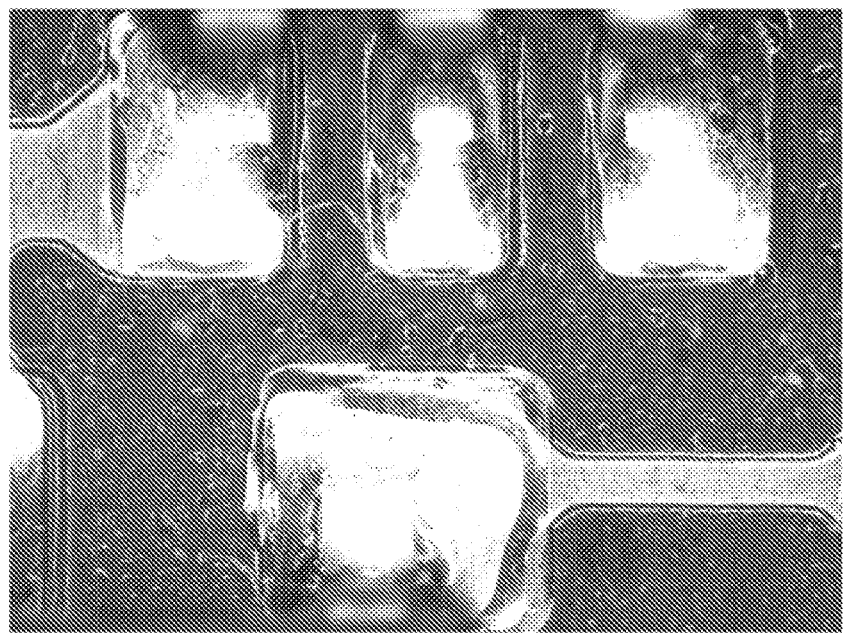
FIG. 1 is an image showing one example of an image with overexposure.

Embodiments of the present invention will now be described with reference to the drawings. It should be noted that the following embodiments illustrate a magnification observation apparatus and a method for creating a high tone image file for embodying the technical idea of the present invention, and the present invention does not limit the magnification observation apparatus and the method for creating a high tone image file creating to the following. The present specification never limits the members described in the appended Claims to the members of the embodiments. In particular, dimensions, materials, shapes, relative arrangement, and the like of the components described in the embodiments should not be taken as limiting the scope of the present invention unless specifically stated, but as merely exemplary examples. The size, position relationship, and the like of the members shown in each figure are sometimes exaggerated to clarify the description. In the following description, the same names or reference numerals indicate the same or equivalent members, and the detailed description will not be repeated. Furthermore, each component constituting the present invention may take a mode in which a plurality of elements is configured with the same member and one member is also used as a plurality of elements, or the function of one member may be shared by a plurality of members.

The connection between a magnification observation apparatus used in the examples of the present invention and a computer, a printer, an external storage device, and other peripheral equipment connected to the apparatus for operation, control, display, and other processes includes serial connection such as IEEE1394, RS-232x and RS-422, and USB; parallel connection; or electrical, magnetic or optical connection through a network such as 10 BASE-T, 100BASE-TX, and 1000BASE-T to perform communication. The connection is not limited to a physical connection using wires and may be wireless LAN such as IEEE802.1x, wireless connection using electric wave, infrared or optical communication such as Bluetooth. The recording medium for exchanging data and saving the setting includes memory cards, magnetic discs, optical discs, magnetooptical discs, and semiconductor memories. In the present specification, the term "magnification observation apparatus" is not limited to a magnification observation apparatus body and is used to include a magnification observation system combining peripheral equipment such as computers and external storage devices.

In the present specification, the magnification observation apparatus and the method for creating a high tone image file are not limited to the system that generates an image file including a synthesized image, as well as an apparatus and a method for performing, in hardware, input/output, display, calculation, communication, and other processes relating to the generation of an image file. The scope of the present invention also encompasses an apparatus and a method for realizing the processes in software. For instance, the apparatus and the system that cause a general purpose circuit and a computer to incorporate software and programs, plug-ins, objects, libraries, applets, compilers, modules, macroinstructions on a specific program, and the like and perform image generation or processes relating thereto also correspond to the magnification observation apparatus and the method for creating a high tone image file of the present invention. In the present specification, the computer includes, in addition to general purpose or dedicated electronic calculators, work stations, terminals, portable electronic equipment, mobile phones such as PDC, CDMA, W-CDMA, FOMA (registered trademark), GSM, IMT2000, and fourth generation, PHSs, PDAs, pagers, smartphones, and other electronic devices. In the present specification, the term "program" is not limited to one used alone and may be used in a mode of functioning as part of a specific computer program, software, a service, and the like, a mode of being invoked and functioning when necessary, a mode of being provided as a service in an environment such as an OS, a mode of being resident and operating in the environment, and a mode of operating in background, or as a support program.

[First Embodiment]

Figure 4:
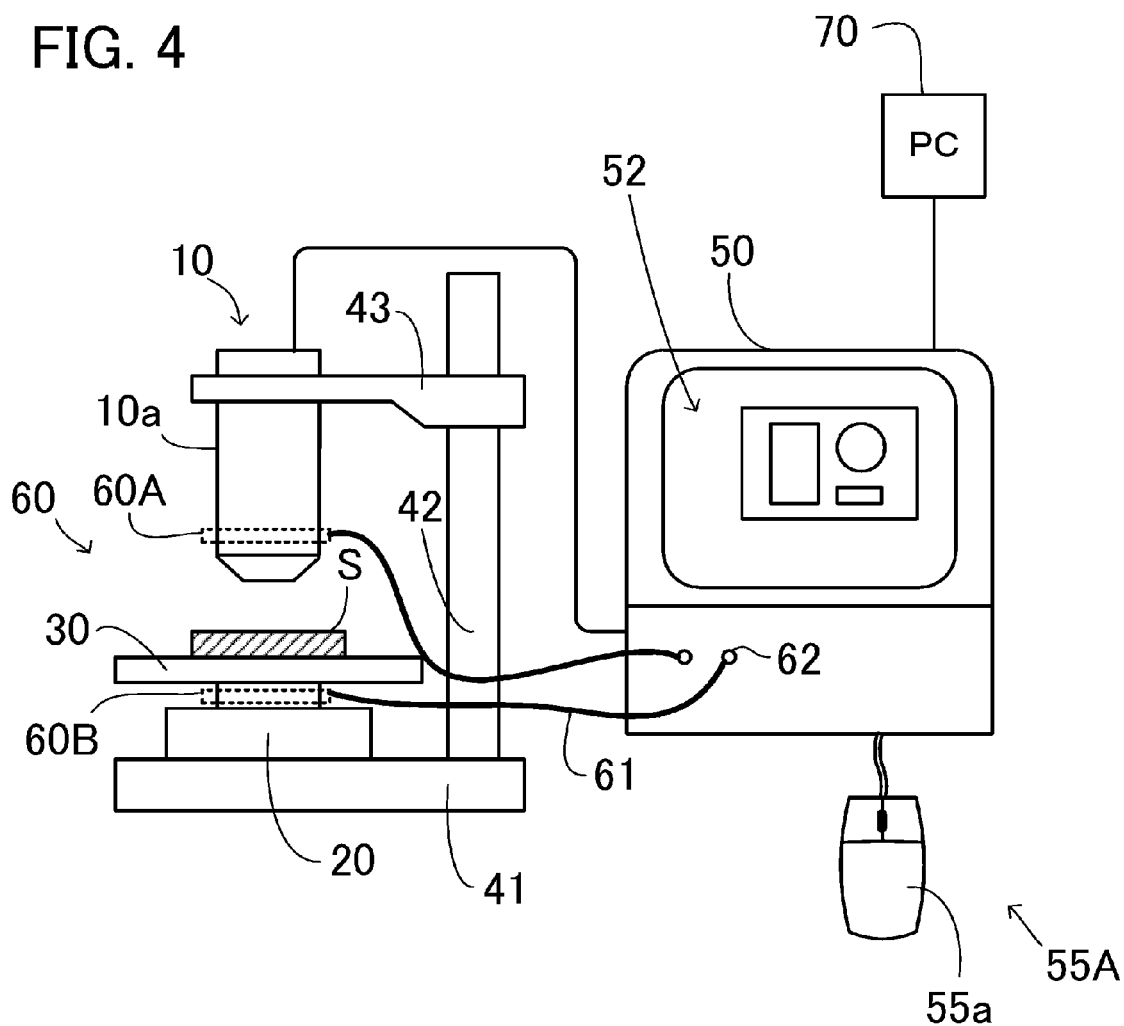
FIG. 4 is an outer appearance view showing a magnification observation apparatus according to an embodiment of the present invention.
Figure 5:
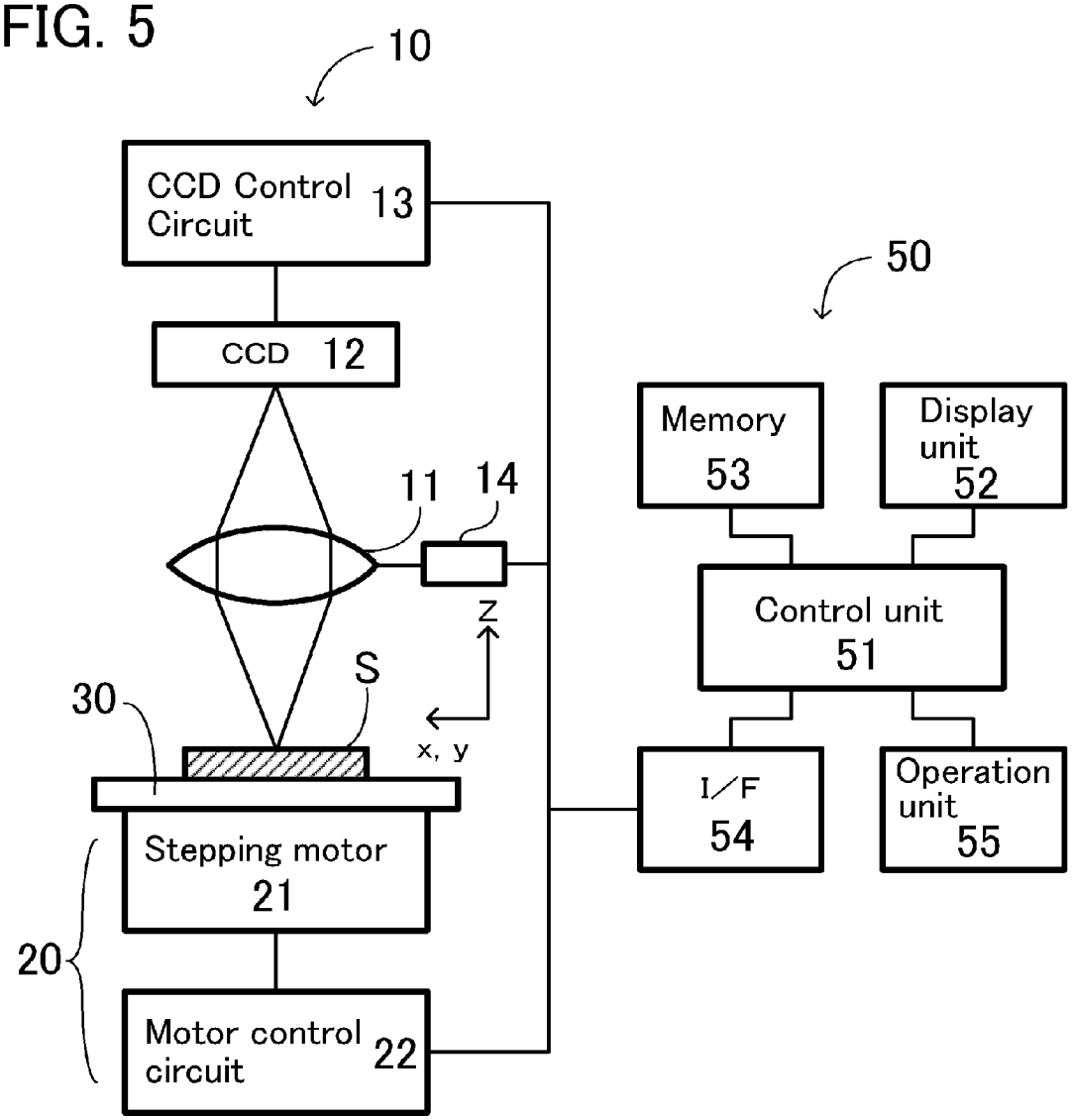
FIG. 5 is a block diagram of a magnification observation apparatus according to a first embodiment of the present invention.

A magnification observation apparatus according to a first embodiment of the present invention will be described with reference to FIGS. 4 and 5. As shown in FIG. 4, the magnification observation apparatus includes an illumination unit 60 for illuminating a sample (subject) to be observed, an imaging unit 10 that images the sample illuminated by the illumination unit 60, and an information processing apparatus 50 including a display unit 52 that displays a magnified image imaged with the imaging unit 10. The magnification observation apparatus of FIG. 4 also includes a sample fixing unit (stage 30 to be mounted with a sample S) that fixes the sample, an imaging device (CCD 12) that electrically reads reflected light or transmitted light from the sample S fixed to the sample fixing unit entering through an optical system 11, and a focus adjusting unit (stage lifting/lowering unit 20) that adjusts a focus by changing the relative distance in an optical axis direction of the sample fixing unit and the optical system 11. As shown in FIG. 5, the information processing apparatus 50 includes a focal length information storage unit (memory 53) that stores focal length information relating to the relative distance in the optical axis direction between the sample fixing unit and the optical system 11 when the focus is adjusted by the focus adjusting unit along with two-dimensional position information of the sample in a plane substantially perpendicular to the optical axis direction, the display unit 52 that displays an image read by the imaging device, a region setting unit (operation unit 55, pointing device 55A) capable of setting at least one of the regions of a portion of the image displayed by the display unit 52, and a calculating unit (control unit 51) that calculates an average height in the optical axis direction of the sample S corresponding to the region set by the region setting unit based on the focal length information stored in the focal length information storage unit relating to a portion of or all of the sample S corresponding to the region set by the region setting unit. The magnification observation apparatus can calculate an average height (depth) in an optical axis direction of a sample corresponding to a specified region using an imaging device that electrically reads reflected light or transmitted light from the sample fixed to the sample fixing unit entering through the optical system.

As shown in FIG. 5, the imaging unit 10 includes the stage 30, which is one form of the sample fixing unit to be mounted with the sample S; the stage lifting/lowering unit 20 that moves the stage 30; the CCD 12, which is one form of the imaging device that electrically reads the reflected light or the transmitted light entering through the optical system to the sample fixed to the stage 30 for every pixel arranged two-dimensionally; and a CCD control circuit 13 that drives and controls the CCD 12. Furthermore, the information processing apparatus 50 or the magnification observation apparatus body is connected to the imaging unit 10. The information processing apparatus 50 includes the memory 53, which is one form of an image data storage unit that stores image data electrically read by the imaging device; the display unit 52 such as a display or a monitor that displays an image based on the image data electrically read by the imaging device; the operation unit 55 that performs input and other operations based on the screen displayed on the display unit 52; and the control unit 51 that performs image processing and various other processing based on the information inputted by the operation unit 55. The display configuring the display unit 52 is a monitor capable of displaying images at high resolution and may be a CRT, a liquid crystal panel, or the like.

The operation unit 55 is connected to the computer by wire or wirelessly, or is fixed to the computer. The general operation unit 55 includes various pointing devices such as a mouse, a keyboard, a slide pad, a pointing stick, a tablet, a joystick, a console, a rotary selector, a digitizer, a light pen, a numerical keypad, a touchpad, and an acupoint. In addition to the operation of a magnification observation operation program, the operation unit 55 can also be used to operate the magnification observation apparatus itself or the peripheral equipment thereof. A touch screen or a touch panel may be used for the display itself that displays an interface screen, so that the user can perform input or operation by directly touching the screen by hand, or alternatively or in addition thereto, voice input and other existing input means may be used. In the example of FIG. 4, the operation unit 55 is configured by a pointing device 55A such as a mouse 55a.

FIG. 4 shows an outer appearance view of the magnification observation apparatus according to the embodiment of the present invention. A camera 10a including an optical system and an imaging device is attached to a camera attachment unit 43 fixed to a supporting column 42 extending in a vertical direction from a stand board 41. The stage lifting/lowering unit 20 having the stage 30 to be mounted with the sample S attached to an upper portion is provided on the stand board 41. The camera 10a and the stage lifting/lowering unit 20 are connected to and controlled by the information processing apparatus 50. The information processing apparatus 50 includes the display unit 52 and the operation unit 55 such as the mouse 55a. An observed image is displayed on the display unit 52.

A computer 70 is connectable to the magnification observation apparatus or the information processing apparatus 50, where the magnification observation operation program can be separately installed in the computer 70 so that the magnification observation apparatus can be operated from the computer 70 side. In the present specification, the magnification observation operation program for operating the magnification observation apparatus using the computer includes, in addition to operation programs installed in a general purpose or a dedicated computer externally connected to the magnification observation apparatus, an operation program incorporated in the information processing apparatus 50 or the control unit of the magnification observation apparatus described above. The operation function or the operation program for operating the magnification observation apparatus is incorporated in the magnification observation apparatus in advance. The operation program may be installed or updated to the magnification observation apparatus in the form of rewritable software, firmware, and the like. Therefore, the computer that executes the magnification observation operation program includes the magnification observation apparatus itself in the present specification.

FIG. 5 shows a block diagram of the magnification observation apparatus according to the embodiment of the present invention. The information processing apparatus 50 is configured by the display unit 52, the memory 53 that stores control programs, focal length information, received light data, two-dimensional information, and the like, an interface 54 for the information processing apparatus 50 to communicate data with the camera 10a and the stage lifting/lowering unit 20, and the operation unit 55 for the operator to perform operations relating to the magnification observation apparatus. The stage lifting/lowering unit 20 is configured by a stepping motor 21, a motor control circuit 22 that controls rising/lowering of the stepping motor 21, and the like. The imaging unit 10 includes a light receiving device such as the CCD 12 as the imaging device, the CCD control circuit 13 that drives and controls the CCD 12, and the optical system 11 that images the transmitted light or the reflected light of the light emitted on the sample S mounted on the stage 30 from the illumination unit 60 onto the CCD 12.

[Pixel Offset Part]

The imaging unit 10 includes a pixel offset part that obtains high resolution greater than or equal to the resolution of the CCD 12 by pixel offset. The pixel offset achieves higher resolution by synthesizing an image photographed with the subject shifted by half a pixel pitch and an image before the shifting. A representative image shifting mechanism includes a CCD drive method of moving the imaging device, an LPF inclining method of inclining the LPF, and a lens moving method of moving the lens. In FIG. 5, the apparatus includes an optical path shifting unit 14 that optically shifts an incident optical path of the reflected light or the transmitted light entered to the CCD 12 through the optical system 11 from the sample S fixed to the stage 30 in at least one direction by a distance smaller than the interval of one pixel of the CCD 12 in the direction. The mechanism and the method for realizing the pixel offset in one embodiment of the present invention are not limited to the above configuration, and existing methods and methods to be developed in the future can be appropriately used.

The information processing apparatus 50 changes the relative distance in the optical axis direction, or the height in the z direction, between the stage 30 serving as the sample fixing unit and the camera 10a including the optical system 11 and the CCD 12 serving as the imaging device by inputting control data relating to the control of the stepping motor 21 to the motor control circuit 22. Specifically, the information processing apparatus 50 controls the rotation of the stepping motor 21 by inputting control data necessary for the control of the stage lifting/lowering unit 20 to the motor control circuit 22, and raises/lowers the height z (position in the z direction) of the stage 30. The stepping motor 21 generates a rotation signal corresponding to the rotation. The information processing apparatus 50 stores the height z of the stage 30 serving as information relating to the relative distance in the optical axis direction between the sample fixing unit and the optical system 11 based on the rotation signal inputted through the motor control circuit 22. The stage serves as an observation positioning part 30A that positions an observation position with respect to the sample. In the present embodiment, an example of changing the relative distance in the optical axis direction between the sample fixing unit and the optical system by changing the height of the stage 30 has been described, but the height of the optical system 11 such as the height of the camera 10a may be changed with the stage 30 fixed. The stage may be provided on a head member, which is a member different from the body, other than on the magnification observation apparatus body, or the imaging unit that does not include the stage may be provided on the head member. The imaging unit that does not include the stage can be attached to an attachment stand or can be carried by the user. Such a head member is connected to the magnification observation apparatus body by a cable.

The CCD 12 can electrically read the amount of light received for every pixel arranged two-dimensionally in the x and y directions. The image of the sample S imaged on the CCD 12 is converted to an electrical signal according to the amount of light received in each pixel of the CCD 12, and further converted to digital data in the CCD control circuit 13. The information processing apparatus 50 stores the digital data converted in the CCD control circuit 13 as received light data D along with arrangement information (x, y) of pixel serving as two-dimensional position information of the sample in a plane (x, y direction in FIG. 5) substantially perpendicular to the optical axis direction (z direction in FIG. 5) in the memory 53. The plane substantially perpendicular to the optical axis direction herein does not need to be strictly a plane forming 90° with respect to the optical axis, and merely needs to be an observation plane within an inclination range to an extent where the shape of the sample can be recognized at the resolution of the optical system and the imaging device.

An example of mounting the sample on the stage has been described as one example of the sample fixing unit in the above description, but, e.g., an arm may be attached in place of the stage and the sample may be fixed at the distal end of the arm. Furthermore, the camera 10a may not only be attached to the camera attachment unit 43, but also be removably disposed at a desired position and angle through a hand-held method and the like.

The illumination unit 60 shown in FIG. 4 includes an epi-illumination 60A for emitting epi-light to the sample, and a transmission illumination 60B for emitting transmitted light. Such illuminations are connected to the information processing apparatus 50 by way of an optical fiber 61. The information processing apparatus 50 includes a connector 62 that connects the optical fiber 61 and incorporates a light source (not shown) for giving off light to the optical fiber 61 through the connector 62. A halogen lamp and the like are used for the light source.

[Control Unit 51]

The control unit 51 serving as the control part controls to convert the imaged observed image to the resolution enabling display on the display unit 52 and display the same. In the magnification observation apparatus of FIG. 4, the imaging unit 10 displays the observed image in which the sample S is imaged by the CCD 12 on the display unit 52. Generally, the performance of the imaging device such as the CCD is higher than the display capability at the display unit in many cases, and thus the image is displayed in a reduced manner by lowering the resolution to a size capable of being displayed in one screen by, e.g., decimating the image to display the imaged observed image on one screen. Assuming that the read resolution at the time of being read by the imaging unit 10 is a first resolution, the image is displayed on the display unit 52 at a second resolution lower than the first resolution.

[Second Embodiment]

Figure 6:
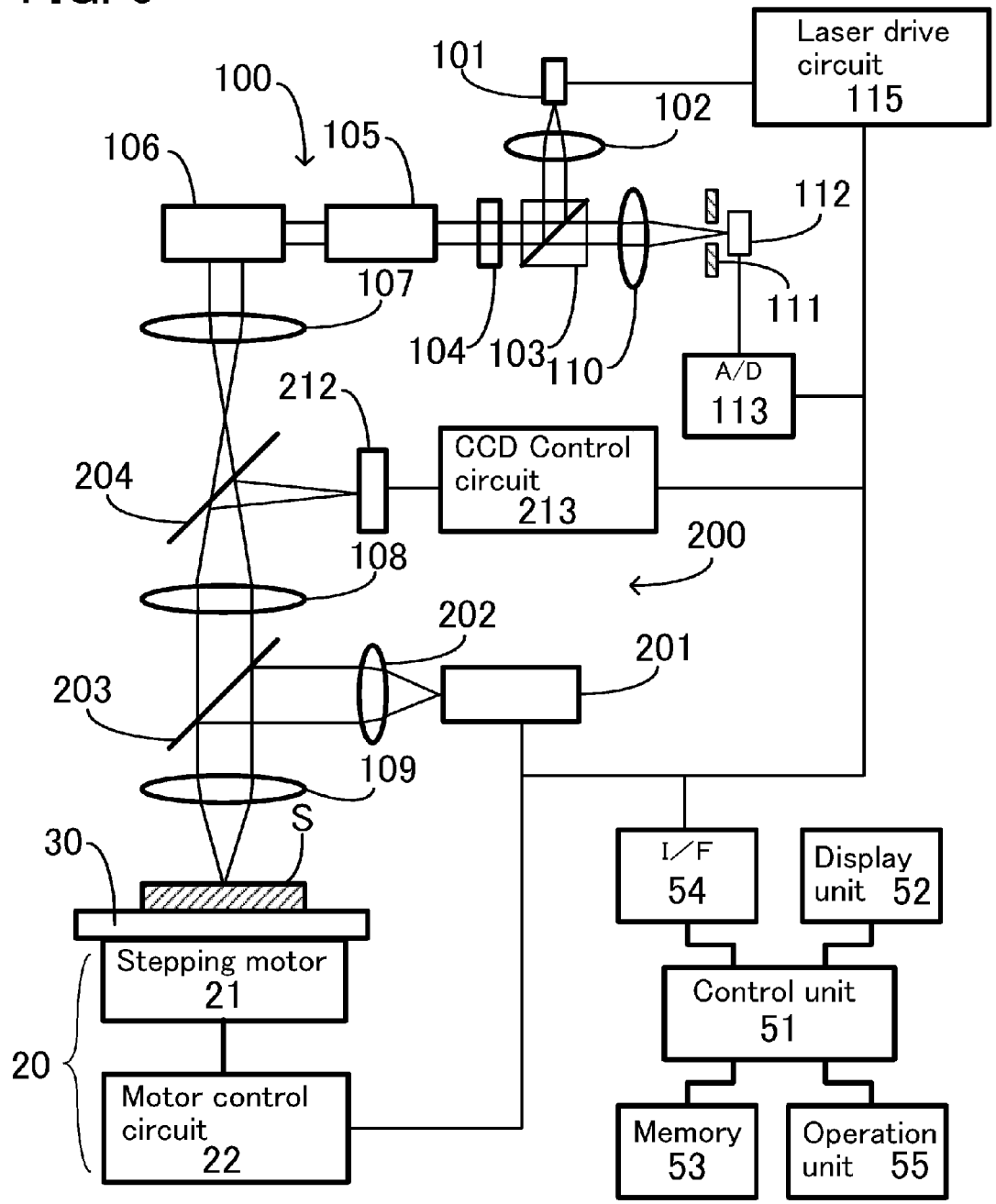
FIG. 6 is a block diagram of a magnification observation apparatus according to a second embodiment of the present invention.

A laser microscope will now be described with reference to FIG. 6 as a magnification observation apparatus according to a second embodiment of the present invention. In the magnification observation apparatus of the second embodiment, the camera serving as the imaging unit includes a first imaging unit in which the reflected light of the light from a first light source (laser 101) emitted on the sample S is received by a first light receiving device (photodiode 112) through a first optical system 100, and a second imaging unit in which the reflected light of the light from a second light source (white lamp 201) emitted on the sample S is received by a second light receiving device (CCD 212) through a second optical system 200.

The first imaging unit will be described first. The first optical system 100 includes a laser 101 that emits monochromatic light (e.g., laser beam) to the sample S, a first collimator lens 102, a polarization beam splitter 103, a ¼ wavelength plate 104, a horizontal deflection apparatus 105, a perpendicular deflection apparatus 106, a first relay lens 107, a second relay lens 108, an objective lens 109, an imaging lens 110, a pin hole plate 111, and a photodiode 112.

The semiconductor laser 101 that emits a red laser beam is used for the first light source, for example. The outgoing laser beam from the laser 101, which is driven by a laser drive circuit 115, passes through the first collimator lens 102, and then passes the ¼ wavelength plate 104 with the optical path changed by the polarization beam splitter 103. After being deflected in the horizontal (lateral) direction and the perpendicular (vertical) direction by the horizontal deflection apparatus 105 and the perpendicular deflection apparatus 106, the laser beam passes the first relay lens 107 and the second relay lens 108 to be collected on the surface of the sample S placed on the stage 30 by the objective lens 109.

Each of the horizontal deflection apparatus 105 and the perpendicular deflection apparatus 106 is configured by a galvanometer mirror and is provided to scan the surface of the sample S with the laser beam by deflecting the laser beam in the horizontal and perpendicular directions. The stage 30 is driven in the z direction (optical axis direction) by the stage lifting/lowering unit 20. The relative distance in the optical axis direction between the focus of the objective lens 109 and the sample S thus can be changed.

The laser beam reflected by the sample S follows the optical path in the opposite direction. That is, the laser beam passes through the objective lens 109, the second relay lens 108, and the first relay lens 107, and again passes through the ¼ wavelength plate 104 after the horizontal deflection apparatus 105 and the perpendicular deflection apparatus 106. As a result, the laser beam transmits through the polarization beam splitter 103 and is collected by the imaging lens 110. The collected laser beam enters the photodiode 112 through the pin holes of the pin hole plate 111 provided at the focal position of the imaging lens 110. The photodiode 112 converts the amount of light received to an electrical signal. The electrical signal corresponding to the amount of light received is inputted to an A/D converter 113 via an output amplifier and a gain control circuit (not shown) to be converted to digital data. An example of using a photodiode as the first light receiving device has been described herein, but a photo-multiplier and the like may be used. The laser 101 is not limited to red laser, and blue or ultraviolet laser may also be used. The height data of high resolution is obtained by using such a short wavelength laser.

By use of the first imaging unit of such a configuration, height (depth) information of the sample S can be obtained. The principle thereof will be briefly described below. When the stage 30 is driven in the z direction (optical axis direction) by the stepping motor 21 and the motor control circuit 22 of the stage lifting/lowering unit 21 in the above described manner, the relative distance in the optical axis direction between the focus of the objective lens 109 and the sample S changes. When the focus of the objective lens 109 is focused at the surface (measurement target surface) of the sample S, the laser beam reflected at the surface of the sample S is collected by the imaging lens 110 through the optical path described above, and thus most of the laser beam passes the pin holes of the pin hole plate 111. Therefore, the amount of light received by the photodiode 112 becomes the maximum at this point. On the other hand, when the focus of the objective lens 109 is shifted from the surface (measurement target surface) of the sample S, the laser beam collected by the imaging lens 110 is focused at a position shifted from the pin hole plate 111, and thus only part of the laser beam can pass through the pin holes. As a result, the amount of light received by the photodiode 112 thus significantly decreases.

Therefore, the height of the stage 30 where the amount of light received becomes the maximum can be obtained by detecting the amount of light received by the photodiode 112 at any point on the surface of the sample S while driving the stage 30 in the z direction (optical axis direction).

Figure 7:
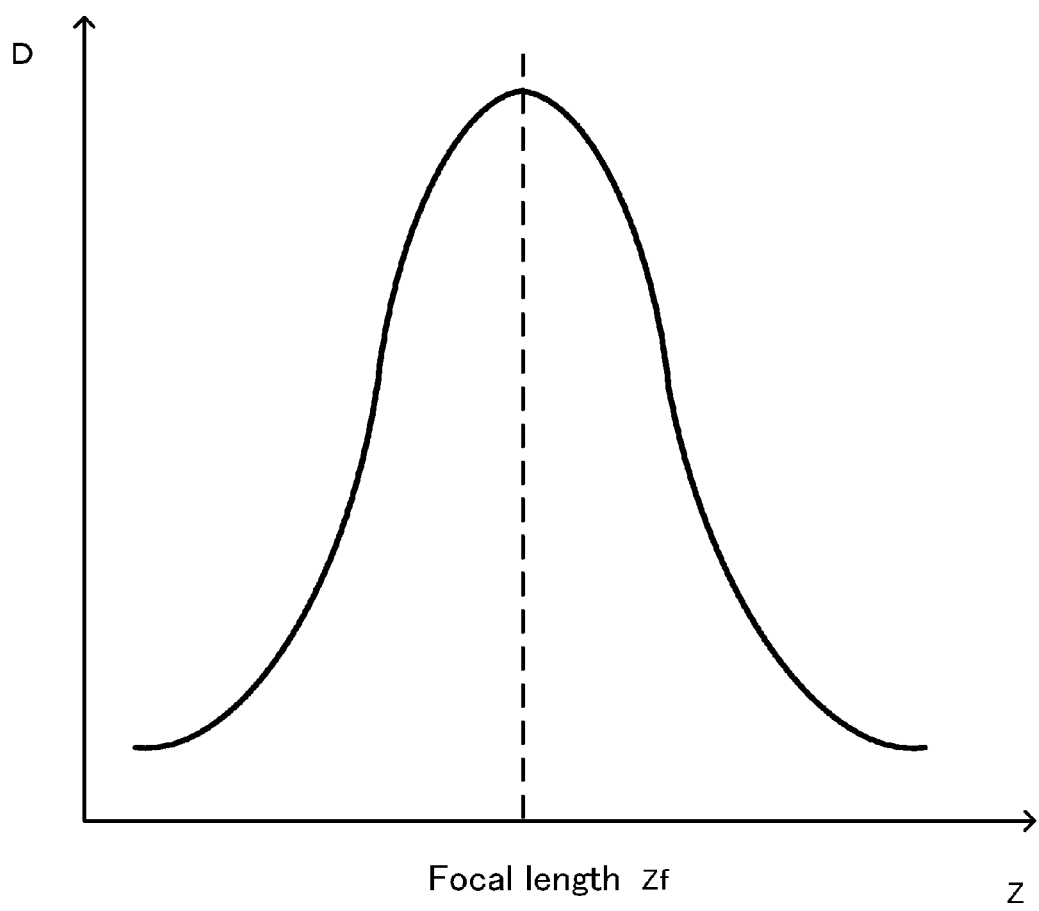
FIG. 7 is a graph showing change in received light data with respect to height z.

Actually, the amount of light received by the photodiode 112 is acquired by scanning the surface of the sample S by the horizontal deflection apparatus 105 and the perpendicular deflection apparatus 106 for every step movement of the stage 30. FIG. 7 shows change in received light data D with respect to the height z of the stage 30 at one point (pixel). When the stage 30 is moved in the z direction from the lower end to the upper end of the measurement range, the received light data D that changes according to the height z is obtained as shown in FIG. 7 for a plurality of points (pixels) within the scanning range. The maximum amount of light received and the focal length Zf thereat are obtained for each point (pixel) based on the received light data D. The height of the stage 30 corresponding to the maximum value of the received light data D becomes the focal length Zf. Therefore, distribution in the x-y plane of the surface height of the sample S is obtained based on the focal length Zf. This process is performed by the control unit 51 based on the received light data D of the CCD 12 and the arrangement information (x, y) and the height information z of the pixel inputted through the interface 54 and stored in the memory 53.

The distribution of the obtained surface height is displayed on the display unit 52 through various methods. For instance, the height distribution (surface shape) of the sample may be three-dimensionally displayed by three-dimensional display. Alternatively, the height data may be converted to luminance data to be displayed as two-dimensional distribution of brightness. The height data may be converted to color difference data so that distribution of height is displayed as distribution of color.

In the second embodiment as well, the region is set to a rectangular shape by specifying two points on the image on the display unit 52 by means of the pointing device 55A and the like based on the height data obtained by the first imaging unit, the average height in the region and the relative height between each region are calculated and displayed on the display unit 52, as in the first embodiment.

The surface image (black and white image) of a sample w is obtained from a luminance signal in which the amount of light received obtained for each point (pixel) within the x-y scanning range is assumed as luminance data. If the luminance signal is generated with the maximum amount of light received at each pixel as luminance data, there can be obtained a confocal image having a very deep depth of field focused at each point at different surface height. If fixed at a height (position in the z direction) at which the maximum amount of light received is obtained at a certain pixel of interest, the amount of light received at the pixel of a portion having a large difference in height from the portion of pixel of interest becomes significantly small, and thus there is obtained an image in which only the portion at the same height as that of the pixel of interest are bright.

The second imaging unit will now be described. The second optical system 200 includes a second light source 201 for emitting white light (illumination light for color image photographing) to the sample S, a second collimator lens 202, a first half mirror 203, a second half mirror 204, and a CCD 212 serving as a second light receiving device. The second optical system 200 commonly uses the objective lens 109 of the first optical system 100, and the optical axes of the optical systems 100 and 200 are coincident.

A white lamp or the like is used for the second light source 201, but natural light or indoor light may be used without providing a dedicated light source. The white light emitted from the second light source 201 passes through the second collimator lens 202 and is then collected at the surface of the sample S placed on the stage 30 by the objective lens 109 with the optical path bent by the first half mirror 203.

The white light reflected by the sample S passes through the objective lens 109, the first half mirror 203, and the second relay lens 108, and is reflected by the second half mirror 204 to be entered into the CCD 212 capable of receiving light in color and then imaged. The CCD 212 is provided conjugate with or at a position close to being conjugate with the pin holes of the pin hole plate 111 of the first optical system 100. The color image imaged by the CCD 212 is read by the CCD control circuit 213 and converted to digital data. The color image obtained in this manner is displayed on the display unit 52 as a magnified color image for observation of the sample S.

The confocal image having a deep depth of field obtained in the first imaging unit and the normal color image obtained in the second imaging unit may be combined to generate a color confocal image having a deep depth of field focused at all the pixels, and then displayed. The color confocal image can be easily generated by, e.g., replacing the luminance signal configuring the color image obtained in the second imaging unit with the luminance signal of the confocal image obtained in the first optical system 100.

The magnification observation apparatus equipped with the first imaging unit including the first optical system 100 or a confocal optical system and the second imaging unit including the second optical system 200 or a non-confocal optical system has been described, but the configuration may be one including only the first imaging unit.

If the light receiving device is a two-dimensional imaging device (e.g., CCD) that reads the amount of light received for every pixel arranged two-dimensionally, and the focus adjusting unit has a configuration of adjusting the focus based on the sum of the amount of light received corresponding to part of or all of the sample corresponding to the region set by the region setting unit, as in the magnification observation apparatus according to the first embodiment, the height of the sample can be measured with a simple configuration without requiring a complex configuration such as a confocal optical system. In particular, in such a magnification observation apparatus, the maximum value of the received light data is determined from the change in the received light data with respect to the relative distance on the basis of region set by the operator, that is, considerable number of pixels, and not on the basis of pixel, and the average height is calculated based on the average focal length at that point in time, and thus variation in change with respect to the focal length of the received light data at each pixel can be reduced and highly reliable measurement of average height can be performed even when the CCD is used as the light receiving device with white light as the light source. Furthermore, when using the color CCD as the two-dimensional imaging device, the received light data of the pixel may be calculated based on the received light data of RGB, or the received light data of the pixel may be obtained based on the received light data of one or two color tones of RGB.

If the region set by the region setting unit is larger than the size of the sample and thus contains the entire sample, the portion other than the sample, that is, the upper surface of the stage is preferably excluded from the target of average height calculation. This is because a more accurate sample height can be calculated. In this case, the upper surface of the stage can be determined from, e.g., whether or not the difference in height between a pixel and a pixel adjacent to the pixel is greater than or equal to a predetermined height. Obviously, even if the region set by the region setting unit is part of the sample, it is preferably excluded from the target of average height calculation if the upper surface of the stage is in the region.

In the above embodiments, an example of electrically reading the reflected light from the sample fixed to the sample fixing unit has been described, but light may be emitted from the rear surface of the sample and the transmitted light may be electrically read.

(High Tone Image)

Figure 8:
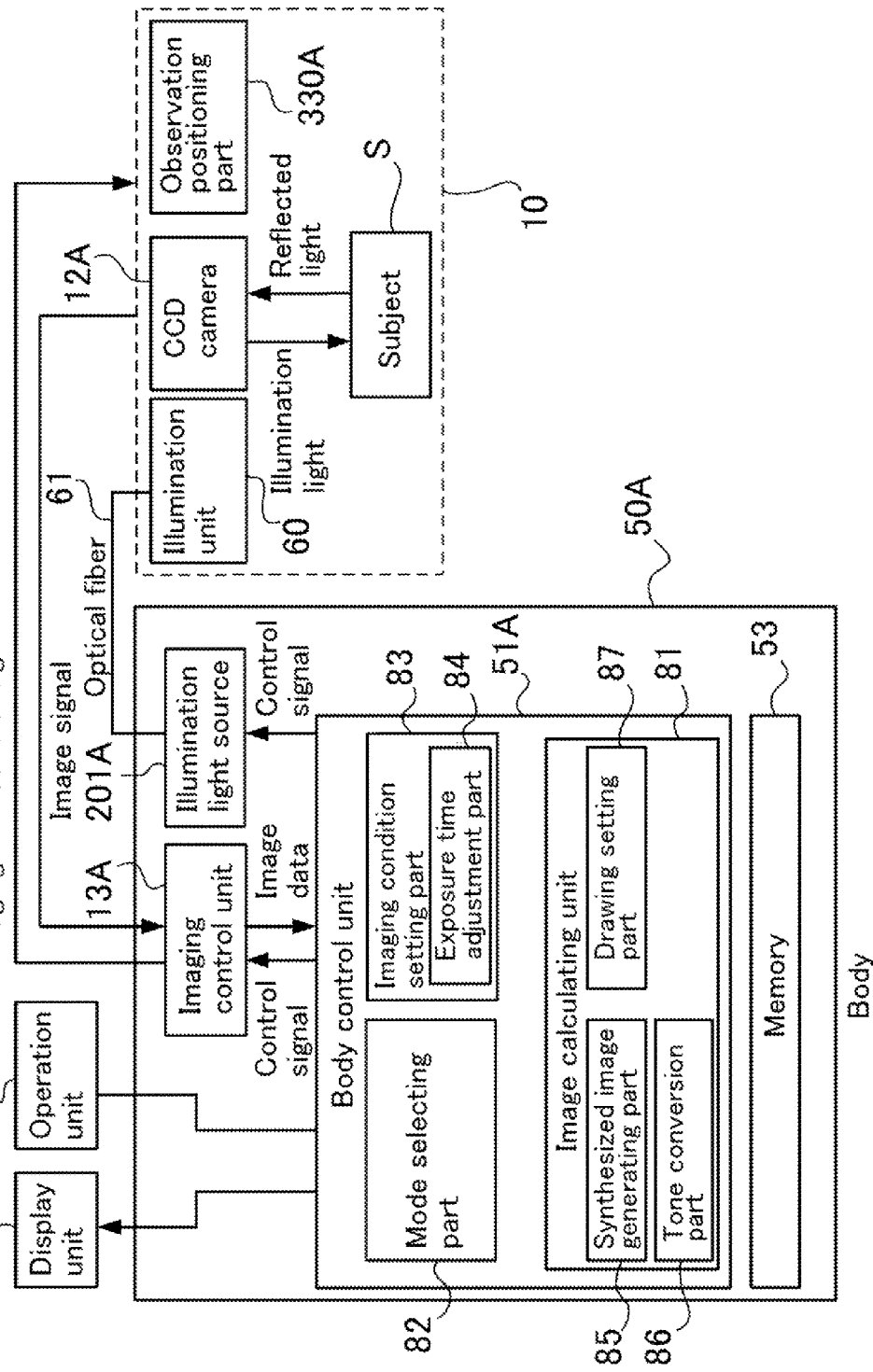
FIG. 8 is a block diagram showing a magnification observation apparatus that generates a synthesized image.

FIG. 8 shows a block diagram of the magnification observation apparatus that images a plurality of original images, synthesizes the images and generates a high tone synthesized image. The magnification observation apparatus shown in the figure includes a body 50A configuring the magnification observation apparatus body and the imaging unit 10. The body 50A and the imaging unit 10 are connected with a cable. In the example of FIG. 8, the cable is configured by an optical fiber 61 for giving off illumination light from the illumination light source 201A, and a signal line 63 for transmitting/receiving data between the body 50A and the imaging unit 10. The body 50A transmits an imaging unit control signal for controlling the imaging unit 10 to the imaging unit 10 via the signal line 63, and the imaging unit 10 transmits an imaged image signal to the body 50A. The signal line for the imaging unit control signal and the signal line for the image signal may be provided individually.

The imaging unit 10 includes an imaging device 12A such as a CCD and a CMOS and the illumination unit 60, where the illumination light is emitted from the illumination unit 60 to the sample S, and the reflected light thereof is imaged with the imaging device 12A. The body 50A includes the imaging control unit 13A that controls the imaging unit 10, an illumination light source 201A that generates the illumination light, a body control unit 51A connected to the imaging control unit 13A and the illumination light source 201A, and the display unit 52 connected to a body control unit 51A for displaying images and necessary information. The body control unit 51A transmits control signals to the imaging control unit 13A and the illumination light source 201A to control the operations thereof. The body control unit 51A also includes an image calculating unit 81 that retrieves image data received by the image control unit 13A from the imaging unit 10 and performs processes such as synthesis, the memory 53 that holds image data and various set values, a mode selecting part 82 for selecting a synthesized image photography mode to be described later, and an imaging condition setting part 83 that sets the imaging conditions in the imaging unit 10. The image calculating unit 81 functions as a synthesized image generating part 85 that synthesizes a plurality of original images and generates high tone synthesized image data, a tone conversion part 86 that performs tone conversion, and a drawing setting part 87 that sets drawing parameters for the tone conversion part 86 to tone-convert a high tone image to low tone image data. Such a body control unit 51A can be configured by an ASIC, an LSI, and the like.

The image data and the set content held in the memory 53 can be displayed on the display unit 52 connected to the body control unit 51A. A monitor such as a CRT, a liquid crystal display, an organic EL, or the like may be used for the display unit 52. The operation unit 55 for the user to perform various operations on the body control unit 51A is connected to the body 50A. The operation unit 55 is an input device such as a console or a mouse. In this example as well, the display unit and the operation unit can be integrally incorporated in the body or may be external members. If the display unit is configured by a touch panel, the display unit and the operation unit can be integrally configured.

(Synthesized Image Photography Mode)

The magnification observation apparatus includes a dynamic range widening photography mode suitable for a dynamic range widening application and a resolution enhancing photography mode of enhancing luminance resolution and enhancing contrast as synthesized image photography modes for acquiring the synthesized image in the synthesized image generating part 85. Generated in the dynamic range widening photography mode is a synthesized image having a wider dynamic range than the original image. Generated in the resolution enhancing photography mode is a synthesized image in which the luminance resolution is enhanced from the original image in a dynamic range narrower than the dynamic range of the imaging device.

(Dynamic Range Widening Photography Mode)

A so-called HDRI is imaged in the dynamic range widening photography mode. The HDRI (High Dynamic Range Image, hereinafter referred to as "HDR image") is an image in which the dynamic range, that is, the ratio between the minimum light amount and the maximum light amount is significantly higher than conventional images. For instance, on the monitor of a standard computer, the color of eight bits to twenty-four bits is adopted as a standard color representation so as to be represented in 256 to 16.77 million tones, but more colors exist in reality, and the eyes of a human view an image by adjusting the image to a reference brightness that appears to be appropriate by changing the size of the pupil. The HDR image with a greater amount of color information that exceeds the representation capability and the like of the monitor is therefore used. An existing method such as synthesizing a plurality of images obtained by imaging the same observation target at the same position and under different imaging conditions (typically, exposure time of the imaging device) may be used to acquire such an HDR image.

Figure 3:
FIG. 3 is an image showing an HDR image in which the images of FIGS. 1 and 2 are synthesized.

However, the colors of greater than or equal to eight bits to twenty-four bits (256 to 16.77 million colors) cannot be represented on the monitor, where overexposure occurs in colors brighter than the color range that can be represented and underexposure occurs in colors darker than the color range. Since the texture and the like of the image sometimes cannot be recognized in this state, tone conversion (tone mapping) is appropriately performed to convert the image to a low tone image (hereinafter also referred to as Low Dynamic Range Image (LDR image)) in which portions of overexposure and underexposure can be recognized, when the HDR image is displayed on the monitor and the like. For instance, overexposure occurs at the metal portion in the image shown in FIG. 1, but that portion is clearly seen in the image shown in FIG. 3. This is because the image of FIG. 3 has data of a portion having a light amount greater than the light amount that can be photographed in FIG. 1. In a general environment, the light amount data has a dynamic range of about 100000:1 at a maximum.

Figure 2:
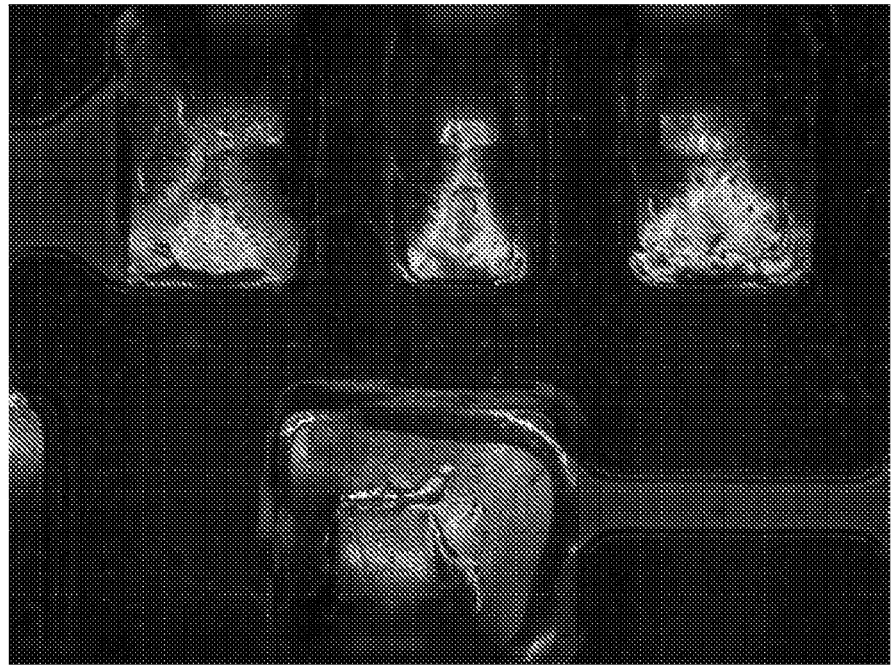
FIG. 2 is an image showing one example of an image with underexposure.

Various methods have been proposed for creating the HDR image, but in the present embodiment, the HDR image is created by synthesizing a plurality of original image groups obtained by photographing a sample at the same position while changing the exposure time or the shutter speed of the imaging device herein, in the above-described manner. For instance, the HDR image shown in FIG. 3 can be created by synthesizing the dark image of FIG. 2 and the bright image of FIG. 1.

Figure 9:
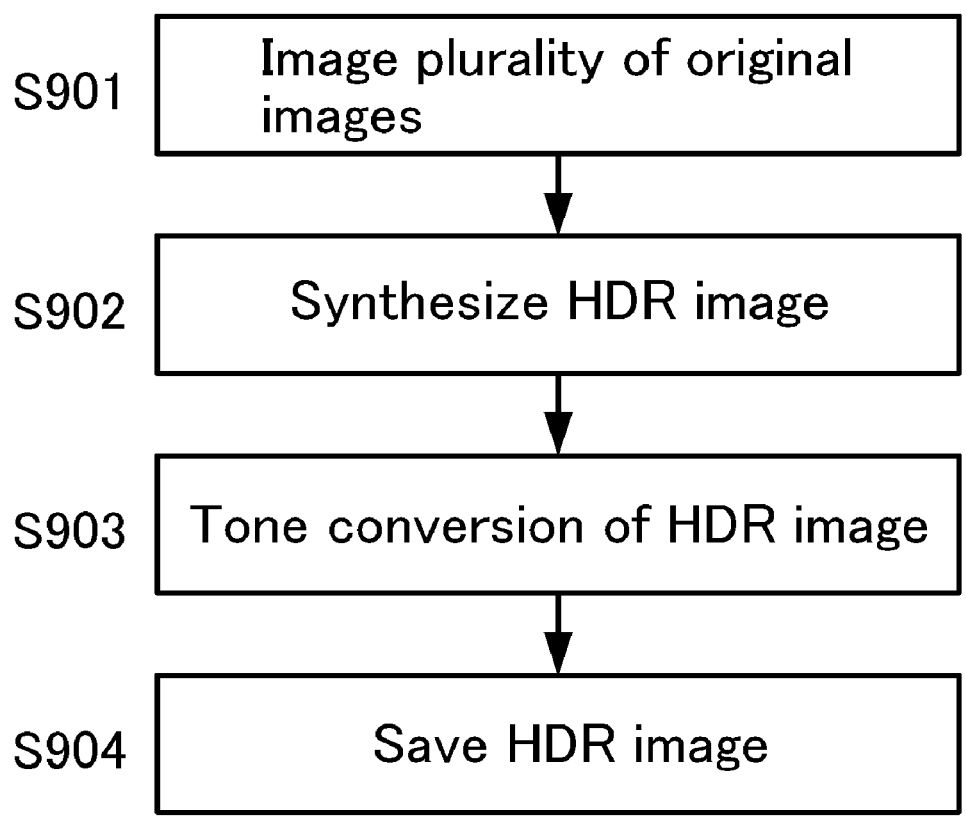
FIG. 9 is a flowchart showing a procedure from photographing an HDR image to displaying the HDR image on a display unit.

Since the dynamic range of the HDR image may be 100000:1, the HDR image cannot be represented with the usual eight-bit image of 256 tones. Thus, the data is generally represented in floating point. Thirty-two bit single precision floating point, sixteen bit floating point, or the like is used for the format for saving the file. When drawing the HDR image, the HDR image cannot be displayed as it is on a usual monitor of 256 tones since the dynamic range is wide. If the HDR image is displayed by simply converting (mapping) the image to 256 tones, the dark portion sometimes cannot be seen or the bright portion sometimes becomes too bright. Thus, the image needs to be adjusted so that the dark portion and the bright portion can be moderately viewed before displaying the same. Specifically, the image is tone-converted to a tone mapping image on which image processing is performed so as to greatly squeeze the bright portion and raise the dark portion. Thus, fine textures, which are difficult to be seen in the normal tone mapping image, can be displayed in an enhanced manner. The procedure from photographing an HDR image to displaying the same on the display unit as described above will be described with reference to the flowchart of FIG. 9.

First, in step S901, a plurality of original images is photographed under different imaging conditions. An original image of eight bit is imaged in the imaging unit 10. In this case, the exposure time is appropriately controlled so that at least one image free of overexposure and underexposure can be taken in any region. The number of imaging is appropriately determined according to the image quality, the wideness of the necessary dynamic range, and the like of the HDR image. In step S902, the HDR image is synthesized. The HDR image is synthesized in the synthesized image generating part using the eight-bit image group photographed in step S901. In step S903, the HDR image is tone-converted. The synthesized HDR image is tone-mapped in the tone conversion part to create a tone mapping image converted to a tone width capable of being displayed on a monitor and the like. In this example, conversion is made to 256 tones. In this case, the texture enhancement process and the like are also appropriately performed.

Finally, in step S904, the obtained HDR image and the tone mapping image are saved. The HDR image is thirty-two bit floating point data, where the HDR image data is converted to an appropriate file format and saved when saving the file. The tone mapping image is saved in a versatile image format such as JPEG and TIFF, and the HDR image or original data from which the tone mapping image is generated is saved as metadata. Furthermore, the parameters used at the time of creating the tone mapping image are also saved. Thus, the user can display the tone mapping image with a general purpose image display program and can replace the tone mapping image by using a dedicated image display program. That is, another tone mapping image may be generated from the HDR image by adjusting the parameters, and such a tone mapping image can be newly overwritten on the metadata of the HDR image and saved along with the parameters at the time of conversion. The user can not only browse the tone mapping image but can also change the tone mapping image contained in the file to a desired tone mapping image in the above manner. The HDR image is used in, e.g., applications where saturation such as overexposure and underexposure be suppressed in the image.

The HDR image is obtained by synthesizing images of dynamic ranges wider than the dynamic range of the imaging device, but when the dynamic range of the imaging device is sufficiently wide, that is, when the performance of the imaging device itself is enhanced and a sufficient dynamic range can be covered with one imaging, such one original image can be handled in a similar manner to the synthesized image. In this case, the HDR image is acquired only with the imaging device, and thus the synthesized image generating part becomes unnecessary.

(Resolution Enhancing Photography Mode)

Opposite to the dynamic range widening photography described above, photographing in which the resolution is enhanced so that fine patterns can be displayed in a narrow dynamic range is also possible.

In the resolution enhancing photography mode, the images of which imaging conditions are finely changed are synthesized in a dynamic range narrower than the original image to obtain a synthesized image which luminance resolution is enhanced from the original image. The synthesized image obtained here is literally not an HDR image since the dynamic range is not widened, but is a high tone image similar to the HDR image that can be included in the HDR image in the present specification for the sake of convenience. Furthermore, in the present specification, the HDR image is used to mean that the dynamic range is wider than the dynamic range capable of being displayed on the display unit, but is not limited thereto, and may refer to an image of which the dynamic range is wider than the dynamic range capable of being imaged by the imaging device of the imaging unit or an image having a specific number of bits that is greater than or equal to, e.g., twenty-four bits or thirty-two bits.

Figure 10:
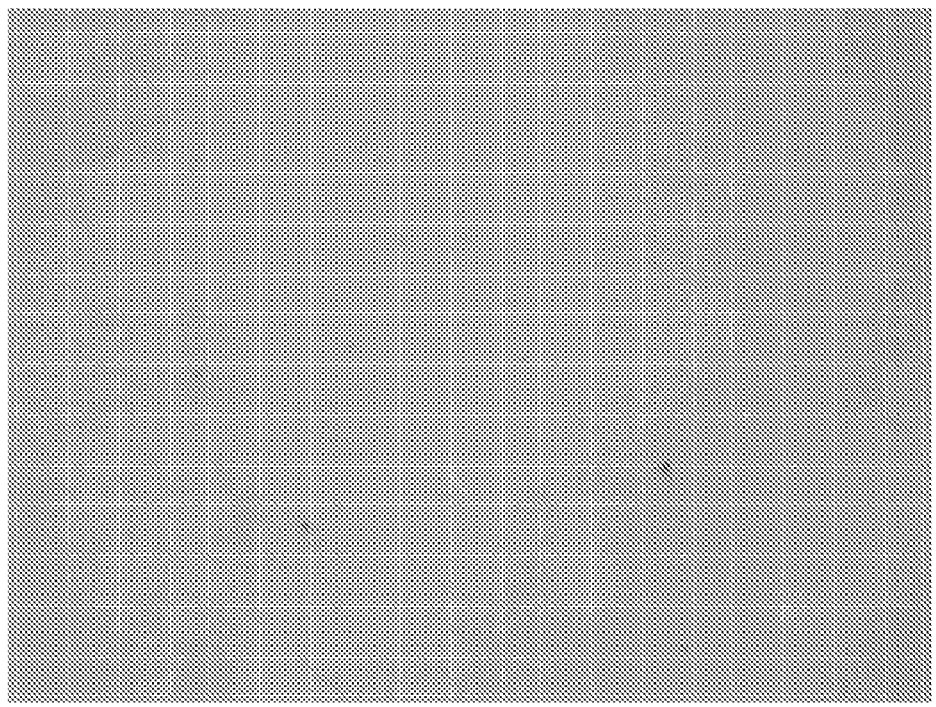
FIG. 10 is an image showing the ceramic surface.
Figure 11:
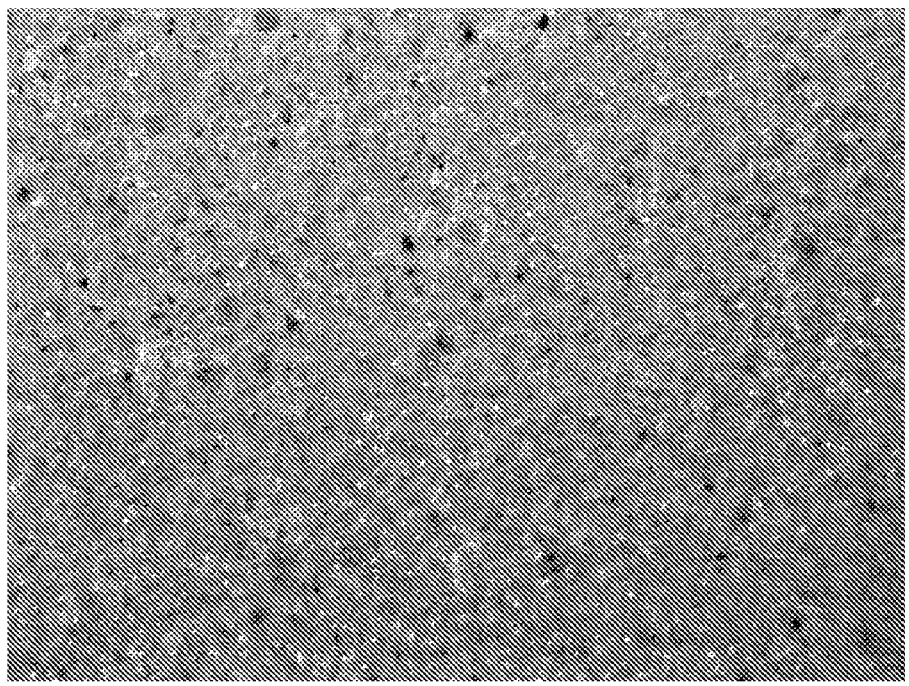

Generally, the HDR image is often applied to applications where halation contained in the image data is eliminated or backlight is corrected, and the like using the wide dynamic range. The HDR image also enables fine textures, which were barely seen, to be seen by retrieving signals embedded in noise/quantization errors through synthesis of a plurality of images with respect to a sample that barely has contrasting density, and performing the texture enhancement process. In this case, a high tone image in which the S/N ratio and the luminance resolution are enhanced is obtained by finely imaging tone images and synthesizing the same in a limited dynamic range. As one example, an image of a ceramic surface is shown in FIG. 10. The pattern is barely recognized at the ceramic surface in this state, but through resolution enhancing photography, the pattern of the surface can be enhanced and the textures, which were barely seen, can be distinguished as shown in FIG. 11.

The HDR technique has been developed taking use in the dynamic range widening application into consideration and has not been used in resolution enhancing photography application of opposite idea. Thus, the application can be extended and use in a wider variety of applications becomes available by achieving a magnification observation apparatus that can be switched between widening of dynamic range and enhancing of resolution according to the observation applications.

Therefore, the resolution enhancing photography mode is used in, e.g., applications where fine patterns and contrast in the image are desirably enhanced. In the resolution enhancing photography mode, the amount of change in exposure time is set smaller than that set in the dynamic range widening photography mode.

(Mode Selecting Part 82)

Either one of the synthesized image photography modes is selected by the mode selecting part 82. The mode selecting part 82 automatically determines an appropriate synthesized image photography mode based on image analysis. Alternatively, the synthesized image photography mode may be manually selected by the user. For instance, the user can operate the operation unit 55 to select a desired synthesized image photography mode. The selected synthesized image photography mode may be clearly shown on the display unit, thereby informing the user with which synthesized image photography mode the photography is being performed.

(Automatic Selection by the Mode Selecting Part)

A method in which the mode selecting part automatically selects the synthesized image photography mode will now be described. Three methods 1 to 3 will be described with reference to the flowcharts of FIGS. 12 to 14, respectively.

(Method 1: Analysis of Observed Image Observed Before Photographing)

Figure 12:
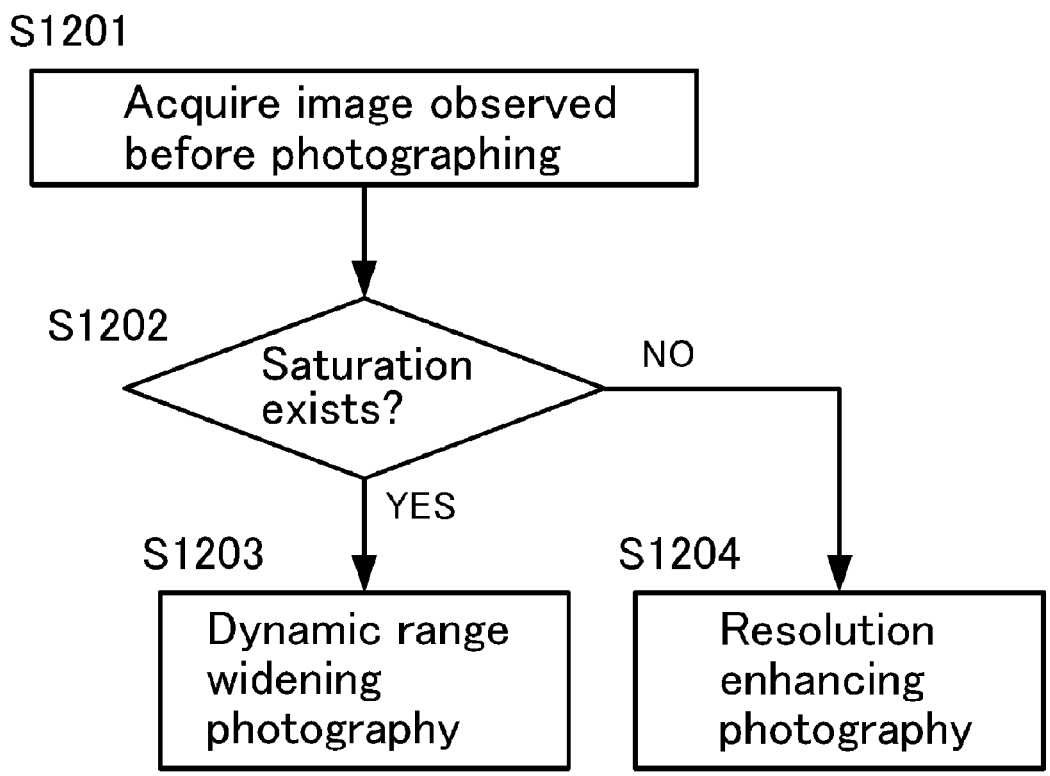
FIG. 12 is a flowchart showing method 1 of automatically selecting a synthesized image photography mode.

First, a method of analyzing an observed image observed before photographing will be described with reference to the flowchart of FIG. 12. In this method, the presence of a saturated region is searched from the image being displayed on the display unit, and the exposure time to be used in the photographing is determined. When photographing in the dynamic range widening application, a saturated region such as overexposure or underexposure is assumed to exist at all times in a portion of the observed image which the user is observing in the current setting. When enhancing the contrasting density, the object being observed is most likely to be an object that barely has contrasting density. Thus, the contrast of the observed image is assumed to be small and saturation is not assumed to occur. Thus, the presence of a saturated region is searched from the image being displayed on the display unit, and the exposure time used in the photographing thereof is determined.

To describe the specific procedure, first, in step S1201, the image observed before photographing of the original image is acquired. At the point where acquisition of synthesized image is instructed, the observed image that has been displayed on the display unit is invoked. In step S1202, the mode selecting part determines whether or not the observed image contains a saturating portion. If the observed image contains a saturating portion, the process proceeds to step S1203 and the dynamic range widening photography mode is set. If the observed image does not contain a saturating portion, the process proceeds to step S1204 and the resolution enhancing photography mode is set. This method allows determining and selecting the appropriate synthesized image photography mode in the simplest manner. The imaging conditions corresponding to each selected synthesized image photography mode can be automatically set as necessary. Thus, the user can obtain the synthesized image without being conscious of the type of synthesized image photography mode, and there is provided an advantage that even users who are not familiar with synthesized image can perform the operation.

(Method 2: Analysis of Temporarily Photographed Plurality of Temporary Images)

The method of analyzing a plurality of temporarily photographed temporary images will be described with reference to the flowchart of FIG. 13 and the histograms of FIGS. 15 and 16.

(Temporary Synthesis)

In this method, prior to the imaging of original image, a plurality of temporary images is first photographed under temporary imaging conditions set in advance, and then determination is made on whether or not there are any temporary image in which a saturated region does not exist for each temporary image in the mode selecting part. The temporary imaging conditions are conditions for easily acquiring an image, where a plurality of temporary images is imaged while appropriately changing the conditions since the tendency of the images merely needs to be grasped. Thus, the setting may be rougher than the imaging conditions of the original image necessary for the generation of synthesized image, the number of imaging of the temporary image is set less than the number of original images necessary for the generation of synthesized image, and the changing width of the exposure time is also set to be large. In this example, the temporary synthesized image is synthesized with the synthesized image generating part, but a calculation part for easily synthesizing the temporary images at high speed may be separately prepared.

FIGS. 15A to 15D and 16A to 16D show exemplary histograms of the luminance distribution of an imaged temporary image. In this example, four images are taken for the same site in different samples A and B while roughly changing temporary imaging conditions, where FIGS. 15A to 15D show a sample A and FIGS. 16A to 16D show a sample B. Such temporary images are displayed in the order of changing the exposure time as a temporary imaging condition. That is, the exposure time is changed so as to become longer in the order of FIGS. 15A to 15D or FIGS. 16A to 16D.

Regarding the sample A, a saturated region exists in all of FIGS. 15A to 15D. The fact that a saturated region exists in all the temporary images indicates that the dynamic range for grasping the entire luminance information contained in the sample is not sufficient. Therefore, determination is made that the dynamic range widening photography mode is suited for this sample in the mode selecting part.

Figure 16A:
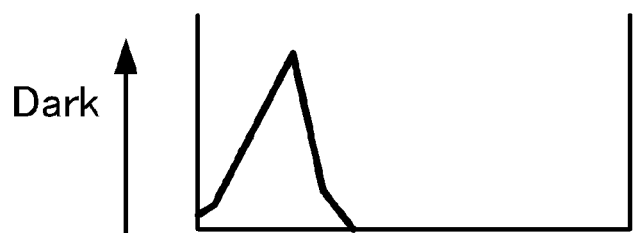
FIGS. 16A to 16D are graphs showing exemplary histograms of luminance distribution of a temporary image of sample B.
Figure 16B:
Figure 16C:
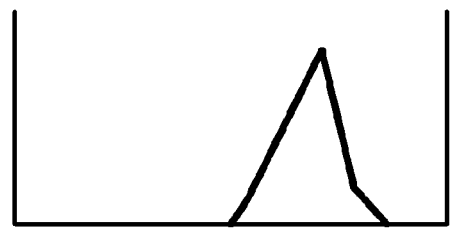
Figure 16D:
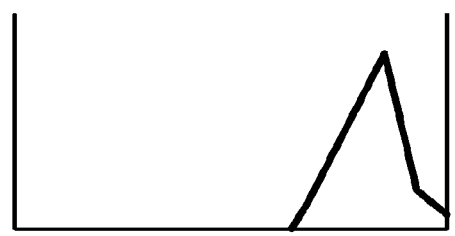

Regarding the sample B, a saturated region is found in FIGS. 16A and 16D, but a saturated region is not found in FIGS. 16B and 16C. Thus, it is apparent that all the luminance distribution can be made fine with one temporary image for the sample B, that is, the dynamic range of the luminance distribution is narrow. In this case, it is preferable to acquire detailed information by finely changing the exposure time within the narrow dynamic range. Therefore, determination is made that the resolution enhancing photography mode is suited for the sample B.

The specific procedure of the above will be described with reference to the flowchart of FIG. 13. First, in step S1301, temporary imaging is performed a plurality of times while changing the shutter speed. In step S1302, determination is made on the plurality of temporary images obtained in this manner as to whether a saturated region exists in every temporary image by the mode selecting part. If a saturated region exists in all the temporary images, the process proceeds to step S1303, and the dynamic range widening photography mode is selected. If a saturated region does not exist, i.e. if there is a temporary image that does not contain a saturated region, the process proceeds to step S1304, and the resolution enhancing photography mode is selected. In the examples of FIGS. 15A to 15D and 16A to 16D, determination is made by the mode selecting part that FIGS. 15A to 15D are suited for the dynamic range widening photography mode, and FIGS. 16A to 16D are suited for the resolution enhancing photography mode.

As described above, an appropriate exposure time can be automatically set for the imaging condition corresponding to each selected synthesized image photography mode, as necessary. In particular, in this method, a range for changing the exposure time to be set in each synthesized image photography mode can be simultaneously obtained in addition to automatic selection of the appropriate synthesized image photography mode. That is, in the case of the dynamic range widening photography mode, the exposure time is changed in a range from the exposure dark enough so that overexposure is eliminated to the exposure bright enough so that underexposure is eliminated. In the resolution enhancing photography mode, and the exposure time is set such that saturation does not occur, the exposure time being for the portion at which the difference in contrasting density appears the most. Thus, not only the setting of the synthesized image photography mode, but the setting of the imaging condition in each synthesized image photography mode can be automated.

(Automatic Setting of the Exposure Time by Method 2)

Details for setting the range in which the exposure time is to be changed as the imaging condition in each synthesized image photography mode will be first described for the dynamic range widening photography mode. In a histogram, when the luminance is imaged at a resolution of eight bits, a saturated region is assumed to exist if either the left or the right end has a value in the luminance distribution range of 0 to 255. For instance, the luminance has a value (luminance 0) on the axis on the left side in FIG. 15A, and thus a region darker than the above exists, whereby the fact that the data is not detected, that is, occurrence of underexposure is recognized. The vicinity of the axis on the right side (luminance 255) does not have a luminance value. That is, it is found that overexposure is not occurring. Furthermore, determination can be made that the upper limit of the brightest luminance is the circled position in FIG. 15A.

Figure 15A:
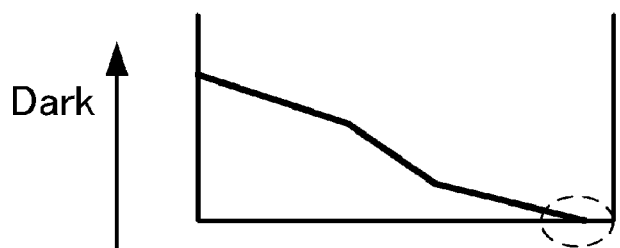
FIGS. 15A to 15D are graphs showing exemplary histograms of luminance distribution of a temporary image of sample A.
Figure 15B:
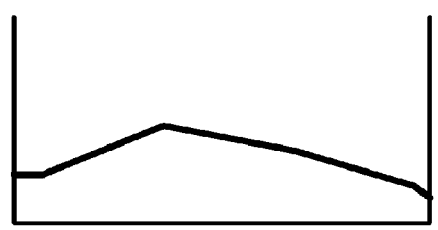
Figure 15C:
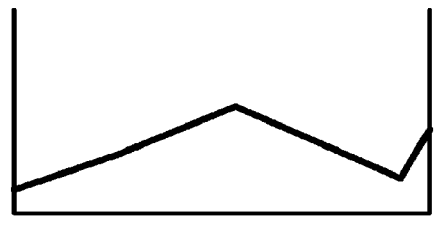
Figure 15D:
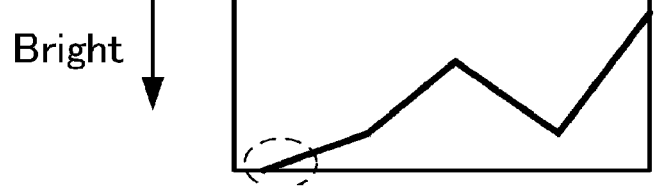

In FIG. 15D, the luminance value is shown on the axis on the right side and occurrence of overexposure can be recognized, but the luminance value is not indicated in the vicinity of the axis on the left side. This means that the luminance information of the darkest region is sufficiently complemented in FIG. 15D, and the circled region of FIG. 15D is determined as the lower limit of the darkest luminance.

Since the upper limit and the lower limit of the range of the luminance distribution can be detected with respect to the sample A, the exposure time is set so that luminance information can be accurately detected within the range. That is, the exposure times corresponding to the luminance values of the upper limit and the lower limit are obtained from a calculation formula, a lookup table, and the like, and the exposure time is changed within the range, so that a high tone image can be efficiently imaged without acquiring useless luminance information.

A method of determining the range for changing the exposure time in the resolution enhancing photography mode will now be described with reference to FIGS. 16A to 16D. In the example of FIGS. 16A to 16D, a saturated region exists in the histograms shown in FIGS. 16A and 16D and thus the remaining histograms shown in FIGS. 16B and 16C are extracted as described above. A temporary image in which difference in contrasting density is represented in the widest range is selected from the temporary images. The distribution in the histogram is represented wider in FIG. 16B than in FIG. 16C. Thus, the luminance information can be efficiently acquired without wasting the acquirable range of luminance distribution using the exposure time adopted in the histogram shown in FIG. 16B. An appropriate exposure time is thereby selected from the temporary imaging conditions used when the temporary images are acquired.

(Method 3 Method by Temporary Imaging and Analysis of Temporary Synthesized Image)

Figure 14:
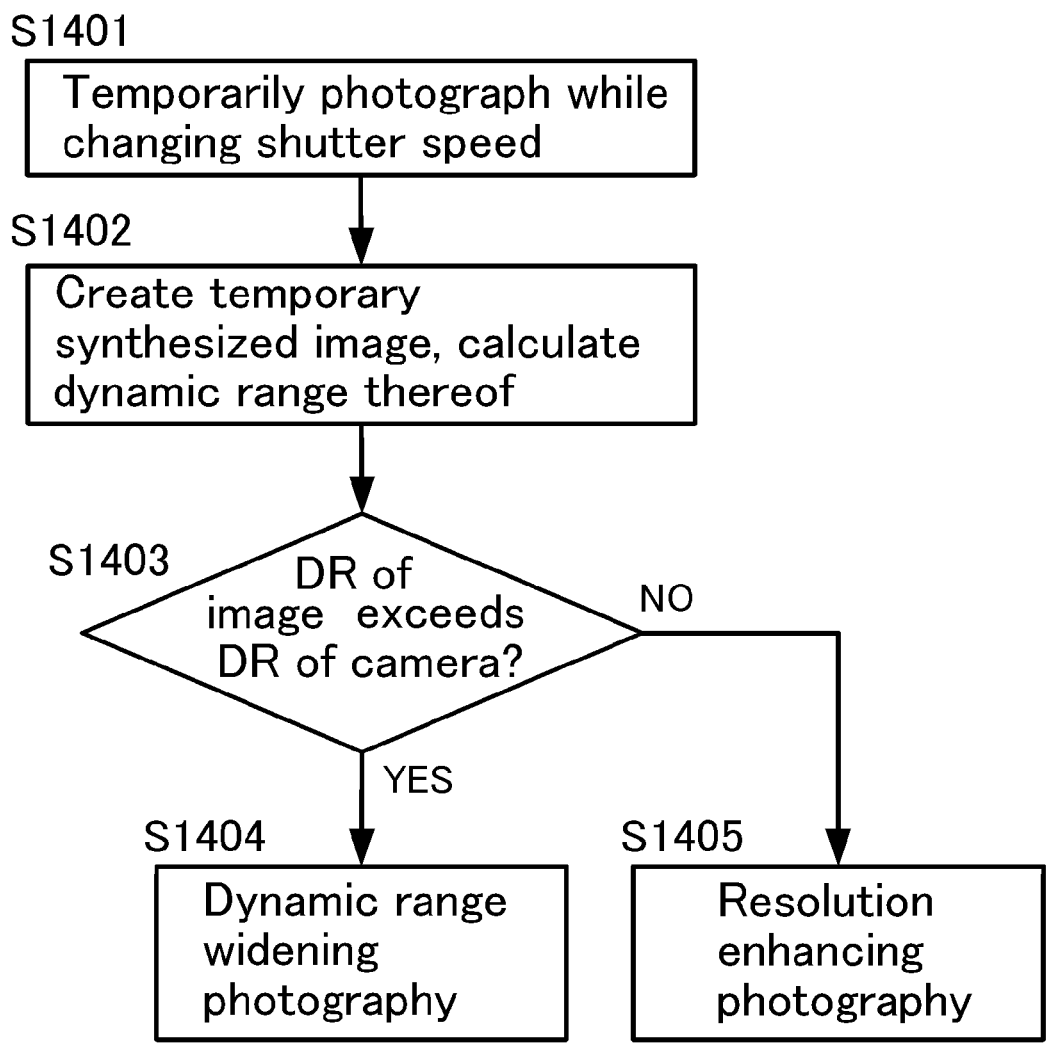
FIG. 14 is a flowchart showing method 3 of automatically selecting the synthesized image photography mode.

Lastly, a method by temporary imaging and analysis of the temporary synthesized image will now be described with reference to the flowchart of FIG. 14. Similar to the above, in step S1401, a plurality of temporary images is imaged under a temporary imaging condition set in advance. The exposure time is greatly changed as compared with, e.g., the imaging of the original image, and the number of images is suppressed to a relatively small number. In step S1402, the plurality of temporary images is synthesized to generate a temporary synthesized image. In step S1403, the dynamic range, that is, the ratio between the minimum luminance and the maximum luminance, of the temporary synthesized image is calculated, and determination is made whether or not such a dynamic range is greater than the dynamic range of the imaging device of the imaging unit 10. If the dynamic range of the temporary synthesized image is greater than the dynamic range of the imaging unit 10, the process proceeds to step S1404, and the dynamic range widening photography mode is selected since the dynamic range is currently insufficient. If the dynamic range of the temporary synthesized image is smaller, the process proceeds to step S1405, and the resolution enhancing photography mode in which the luminance resolution is enhanced is selected since the dynamic range of the imaging unit 10 is sufficient.

(Automatic Setting of Exposure Time by Method 3)

In this method as well, an optimum exposure time in each synthesized image photography mode can be obtained. The following relational expression is established between the luminance I of the image, the light amount L of the scene, the exposure time t, and the response function of the camera (function representing what value the pixel value takes with respect to how much light amount enters the imaging device and how long exposure is performed) F.

$$I=F(L*t)$$

F is measured and acquired in advance. The exposure time $t_1$ to $t_2$ are set to the following range so that the minimum/maximum light amount $L_{min}$ and $L_{max}$ of the temporary synthesized image becomes the pixel value $I_{min}$ (minimum pixel value at which underexposure does not occur, e.g. about 30) and $I_{max}$ (maximum pixel value at which overexposure does not occur, e.g. about 220), respectively, in the case of the dynamic range widening photography mode.

$$t_1=F^{-1}(I_{min})/L_{min}$$

$$t_2=F^{-1}(I_{max})/L_{max}$$

In the case of the resolution enhancing photography mode, the exposure time of one of the following (1) and (2) is set in the range ($t_1$ to $t_2$) in which the minimum/maximum light amounts do not saturate.

(1) exposure time in which the difference between $I_{min}$ and $I_{max}$ becomes the largest (2) exposure time satisfying $L_1*t=x\_max$ by calculating the average value, median value $L_1$, and the like of the light amount L of the scene where x_max is a value of x at which the slope (derivative value F°) of F(x) becomes a maximum.

(Frame Average Value)

When generating a synthesized image in the synthesized image generating part in the resolution enhancing photography mode, in addition to the method of imaging the original image while varying the exposure time, it is possible to adopt a method of imaging a plurality of original images in the imaging unit with the exposure time fixed to a constant value and taking a frame average value to generate synthesized image data. That is, noise is generally mixed in digital images, and such noise is added at an average 0 according to the normal distribution. Thus, the resolution caused by quantization errors can be enhanced while eliminating the influence of noise by taking the average value. For instance, with respect to a pixel whose true value is 100.1, 100 is outputted due to a quantization error if noise is not present, but variation of 98, 104, 101, 97, and the like occurs for every imaging since noise is present. A value after the decimal point (100.1) can be obtained while eliminating the influence of noise by taking the average. According to such a configuration, a synthesized image of high resolution can be generated with the exposure time fixed.

Comparing the above methods, the analysis of the image observed before photographing of method 1 is the most convenient method, and the amount of calculation increases in the order of the method by analysis of temporarily photographed plurality of temporary images of method 2, and the method by temporary imaging and analysis of temporary synthesized image of method 3. On the other hand, the calculation up to the optimum exposure time in each application can be carried out by the methods of 2 and 3.

(Weighted Imaging Condition)

Furthermore, it is possible to adopt, not only a configuration of alternatively selecting either the dynamic range widening photography mode or the resolution enhancing photography mode in the mode selecting part, but a configuration of setting an imaging condition obtained by weighing and combining the imaging conditions for both the photography modes. For instance, the photograph application is analyzed in the mode selecting part, a weighting coefficient for each of the dynamic range widening photography mode and the resolution enhancing photography mode is calculated, and a weighted imaging condition is accordingly set by the imaging condition setting part. Thus, a weighted imaging condition combined in view of the balance between the two modes can be set without fixing the photograph application to either the dynamic range widening photography mode or the resolution enhancing photography mode, and thus more flexible imaging can be performed. In calculating the weighting in the mode selecting part, the ratio between both the photography purposes is determined, and a weighted imaging condition corresponding thereto is set. Specifically, an appropriate imaging condition is set according to how much the weight of halation removal is, or whether or not much weight is placed on the enhancement of contrast. For instance, in determining whether or not a saturated portion is contained in the observed image observed before photographing in step S1202 of FIG. 12, the number and the area of the saturated portion are checked and the weight of each photography mode is determined by the mode selecting part according thereto, instead of uniformly setting the dynamic range widening photography mode when a saturated portion is contained and the resolution enhancing photography mode when a saturated portion is not contained. As one example, the weight of dynamic range widening photography mode is increased the greater the number of saturated portion or the larger the area ratio. Similarly, instead of determining whether a saturated region exists in all the plurality of temporary images in step S1302 of FIG. 13, the mode selecting part may set the weighted imaging condition to give weight to the dynamic range widening photography mode the greater the number of temporary images including a saturated region is and to the resolution enhancing photography mode the greater the number of temporary images not including a saturated region is. Furthermore, in determining whether the dynamic range of the temporary synthesized image is greater than the dynamic range of the imaging device in step S1403 of FIG. 14, the extent of largeness is determined, and the mode selecting part sets the weighted imaging condition to give weight to the dynamic range widening photography mode the greater the ratio or the difference is, and to the resolution enhancing photography mode the smaller the ratio or the difference is. Thus, the criterion is not alternative in the process of determining the photography mode, and more appropriate imaging is realized by setting the imaging condition so as to continuously change the weight.

(Exposure Time Adjustment Part 84)

There may be provided the exposure time adjustment part 84 for further adjusting the exposure time for the original image set by the imaging condition setting part 83 to a desired value. The user adjusts the imaging condition such as exposure time to a desired value from the operation part and the like. Thus, the user can further fine-tune the exposure time using the exposure time adjustment part 84 after the exposure time is automatically set, whereby a more detailed and accurate synthesized image can be acquired.

The exposure time is presented on the display unit, so that the user can further fine-tune the exposure time using the exposure time adjustment part 84. For instance, a mode display region for displaying which synthesized image photography mode of the dynamic range widening photography mode and the resolution enhancing photography mode is selected, is provided on the display unit. Thus, the user can easily check the automatically selected synthesized image photography mode from the display screen. The user can also switch the synthesized image photography mode as necessary.

(Tone Conversion Part 86)

A synthesized image thus obtained by setting an appropriate synthesized image photography mode with the mode selecting part enables the synthesized image photography mode to be grasped on the magnification observation apparatus side, and thus the information on the synthesized image photography mode can also be recorded when saving the file of the synthesized image. When the tone conversion part 86 tone-converts the synthesized image data, the information on the synthesized image photography mode is read out during reading operation to perform appropriate image processing. Alternatively, information on the imaging condition such as exposure time can be recorded to determine whether the observation application of the synthesized image data is for the dynamic range widening application or the resolution enhancing application based on the information.

The observation purpose can be speculated and appropriate image processing can be performed by performing image analysis of the synthesized image or by analyzing the original image data configuring the synthesized image even if such information is not present.

A case of converting the synthesized image data, which is a high tone image, to a tone mapping image, which is a low tone image (LDR image), will be described as one example of performing tone conversion in the tone converting part. It should be noted that the present invention is not limited to tone conversion of synthesized image data, and a process of converting a high tone image to a low tone image of narrower dynamic range can be applied for the high tone image in general. For instance, tone mapping can be applied to a high tone image imaged and synthesized in advance in another imaging device and a high tone image directly imaged without using the original image.

(Drawing Setting Part 87)

In the present embodiment, the setting of drawing parameters relating to image processing in converting the high tone image to the low tone image and displaying or outputting the same can be appropriately and automatically adjusted according to the type of high tone image. Specifically, the high tone image to be converted is automatically determined by the drawing setting part 87 whether it is for the dynamic range widening application or for the resolution enhancing application, and tone conversion is performed in the tone conversion part with halation suppressing process set in the case of dynamic range widening application and contrast enhancement process set in the case of resolution enhancing application. The user can acquire a low tone image suited for a desired observation application without being conscious of the setting of drawing parameters by automatically performing appropriate image processing according to the type of distinguished high tone image.

When used in the dynamic range widening application, drawing is performed with information on the region where saturation such as overexposure or underexposure is occurring contained in the image accurately extracted, and luminance and color substantially the same as those of the observed image before photographing needs to be maintained for other regions. When used in the resolution enhancing application, fine patterns that can barely be distinguished in the observed image before photographing need to be greatly enhanced, and thus the drawn image may differ from the original image in color and the like. Therefore, the drawing setting part 87 sets the drawing parameters corresponding to the type of image to be converted so that appropriate tone conversion corresponding to the type of image to be converted can be carried out.

(Simple Mode)

Figure 17:
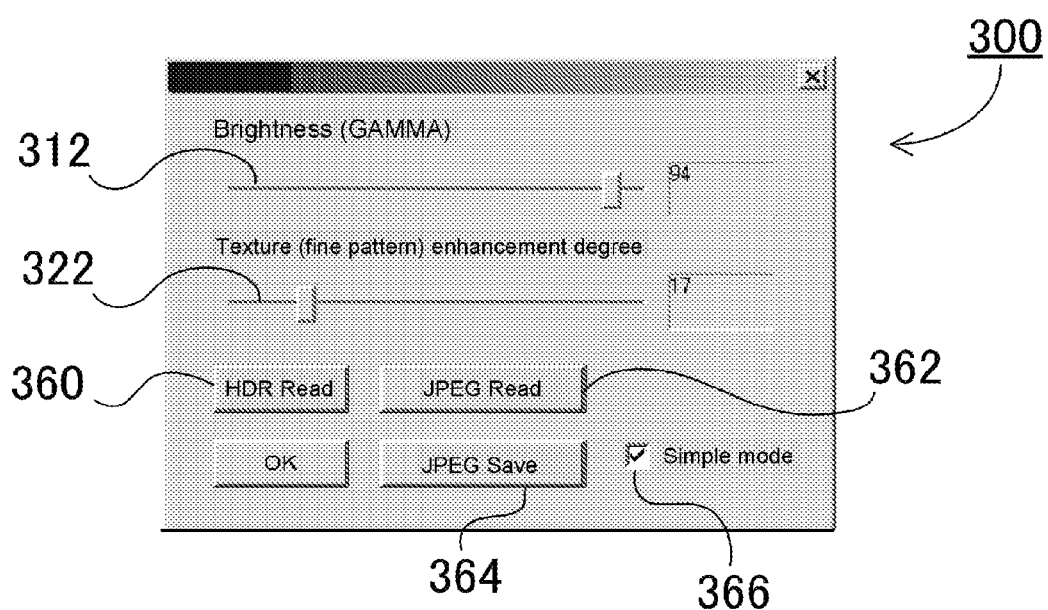
FIG. 17 is an image showing one example of a user interface screen (simple mode) of a magnified image observation program.
Figure 18:
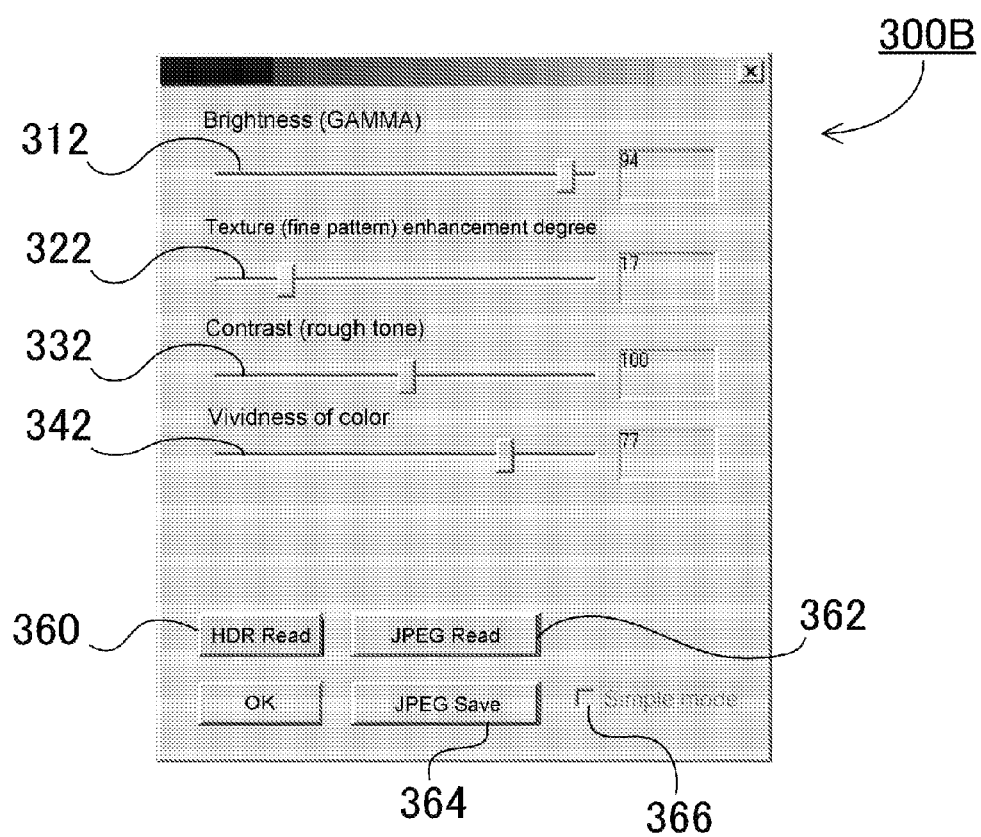
FIG. 18 is an image showing one example of a user interface screen (detailed mode) of the magnified image observation program.

FIGS. 17 and 18 show one example of a user interface screen of a tone conversion console screen for performing tone mapping in the magnified image observation program. A tone conversion console screen 300 shown in FIG. 17 shows a simple mode in which the setting screen is simplified as an automatic setting screen example for automatically setting the drawing parameters for tone conversion, and a tone conversion console screen 300B shown in FIG. 18 shows a detailed mode with the setting items of the drawing parameters increased.

In the tone conversion console screens 300, 300B, a "simple mode" check box 366 is provided as a tone conversion setting switching part for switching the setting part for tone conversion. That is, if the "simple mode" check box 366 is turned OFF in the tone conversion console screen 300 of FIG. 17, the mode switches to the detailed mode shown in FIG. 18, and if the "simple mode" check box 366 is turned ON in the tone conversion console screen 300B of FIG. 18, the screen returns to the simple mode screen shown in FIG. 17.

Sliders for manually adjusting the drawing parameters for tone mapping are provided in each of the tone conversion console screens 300 and 300B. Specifically, the simple mode screen shown in FIG. 17 includes a brightness slider 312 and a texture enhancement slider 322. Currently set numerical values are displayed on the right side of each slider, which numerical values can be increased or decreased by adjusting the slider in the horizontal direction. The numerical values may be specified through direct input.

(Detailed Mode)

In the detailed mode screen of the tone conversion console screen 300B shown in FIG. 18, a contrast slider 332 and a color slider 342 are provided in addition to the brightness slider 312 and the texture enhancement slider 322.

Figure 19A:
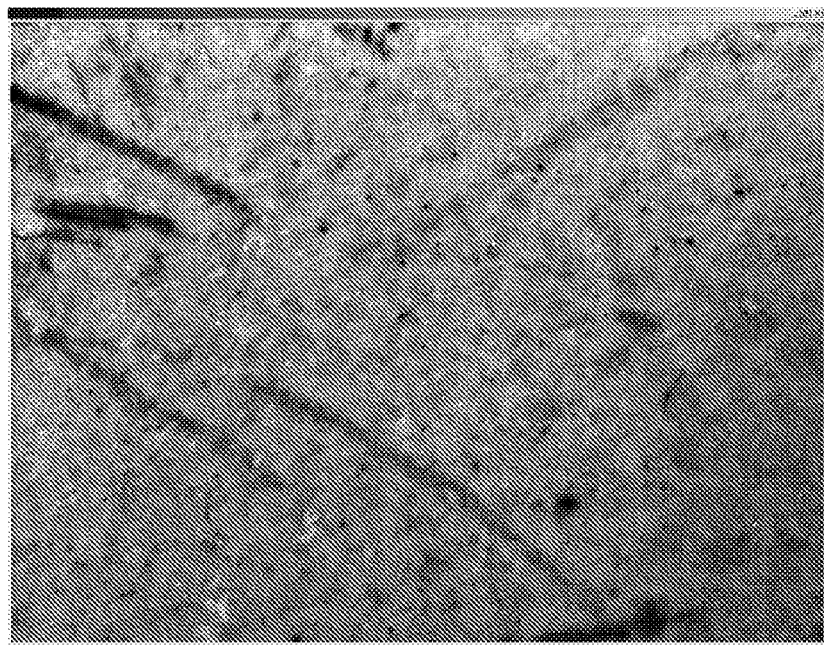
FIGS. 19A and 19B are images showing a state of adjusting a brightness slider for a synthesized image imaged in a resolution enhancing application.
Figure 19B:
Figure 20A:
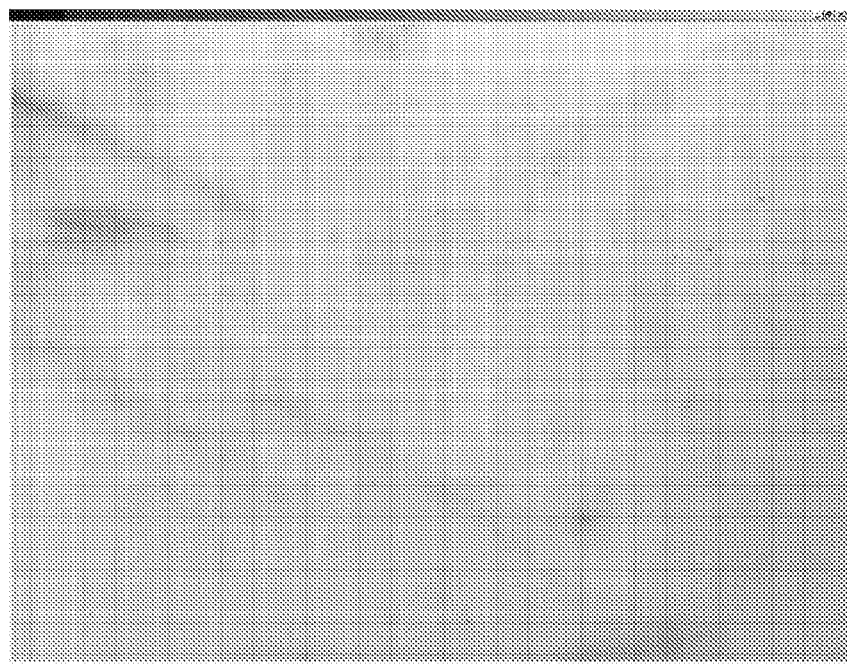
FIGS. 20A and 20B are images showing a state of adjusting a texture enhancement slider for the synthesized image imaged in the resolution enhancing application.
Figure 20B:
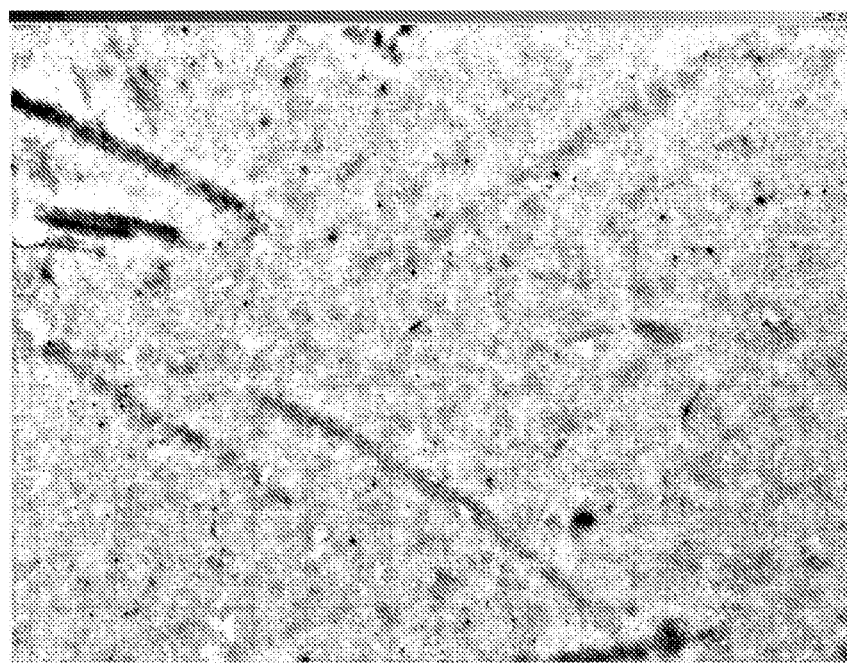

As shown in FIG. 19A to FIG. 22B, the quality of the low tone image displayed on the display unit is changed by operating each slider. First, FIG. 19A shows an example where the brightness slider 312 is set low and FIG. 19B shows an example where the brightness slider 312 is set high for the synthesized image of a ceramic imaged in the resolution enhancing application of narrow dynamic range. The brightness slider 312 can adjust the brightness of image by adjusting the γ (gamma) value. FIG. 20A shows an example where the texture enhancement slider 322 is set low and FIG. 20B shows an example where the texture enhancement slider 322 is set high for the same sample. Thus, the texture enhancement slider 322 enhances fine patterns. In particular, in the resolution enhancing application, the details of the sample with small contrasting density that were difficult to observe can be observed by adjusting the drawing parameters.

Figure 21A:
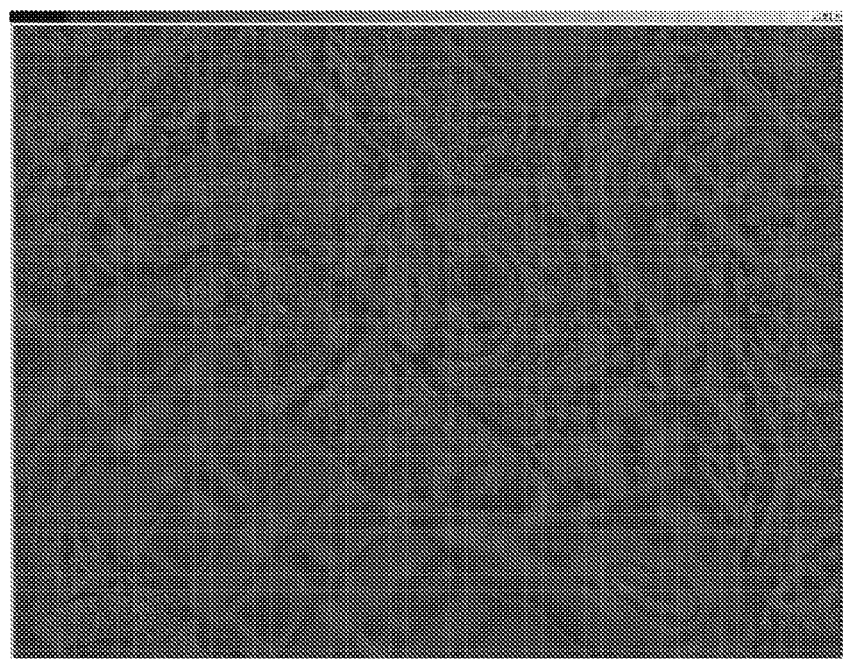
FIGS. 21A and 21B are images showing a state of adjusting a contrast slider for a synthesized image imaged in a dynamic range widening application.
Figure 21B:
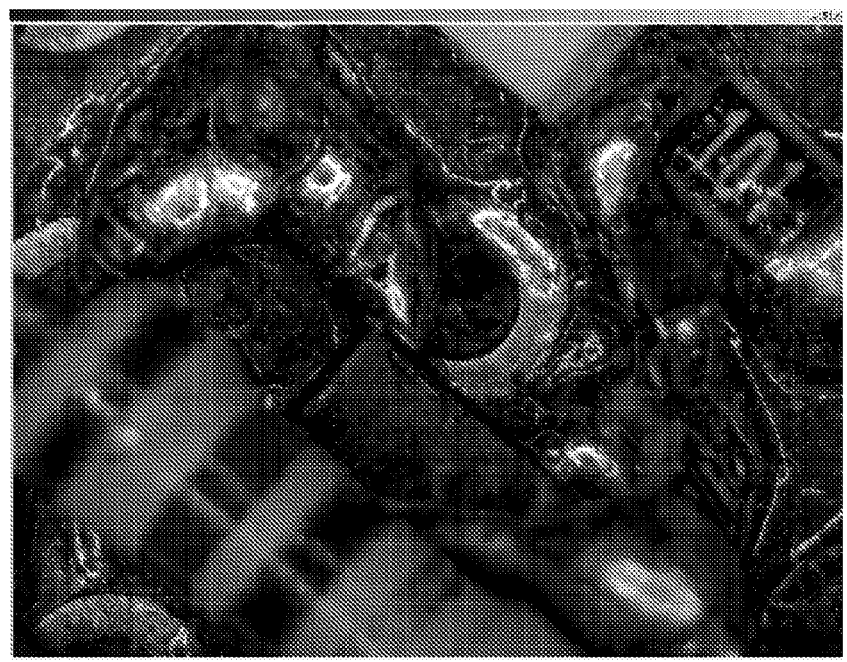
Figure 22A:
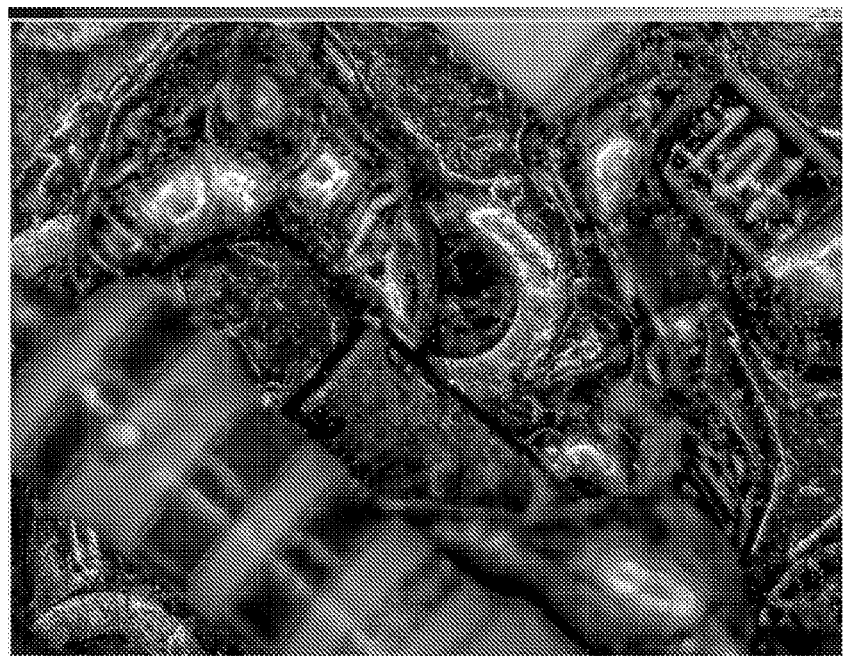
FIGS. 22A and 22B are images showing a state of adjusting a color slider for the synthesized image imaged in the dynamic range widening application.
Figure 22B:

FIG. 21A shows an example where the contrast slider 322 is set low and FIG. 21B shows an example where the contrast slider 322 is set high for the synthesized image obtained by photographing and imaging a soldered circuit of wide dynamic range serving as another sample in the dynamic range widening photography mode. The contrast slider 332 roughly adjusts darkness and brightness. FIG. 22A shows an example where the color slider 342 is set low and FIG. 22B shows an example where the color slider 342 is set high. The color slider 342 adjusts color or vividness of color from monotone to color image. The user can manually adjust the drawing parameters to acquire an appropriate tone mapping image corresponding to each observation purpose and can save the same as necessary.

In the simple mode, the contrast and the color, which are two remaining drawing parameters, can be automatically adjusted from, e.g., an estimation result of the brightness and texture enhancement degree set by the sliders, the drawing parameters after photographing, and the like. Such estimation results are reflected on the value of each slider when switched from the simple mode to the detailed mode.

Various buttons for reading out a file and saving the file are provided at a lower portion of each of the tone conversion console screens 300 and 300B of FIGS. 17 and 18. In this example, an "HDR read" button 360 for reading an HDR image, or a synthesized image, a "JEPG read" button 362 for reading a tone mapping image including a synthesized image data, and a "JPEG save" button 364 for saving the tone mapping image including the synthesized image data are provided.

(Automatic Tone Conversion Procedure of High Tone Image)

A procedure for tone-converting a high tone image to a low tone image will be described with reference to the flowchart of FIG. 23. In step S2401, an HDR image is acquired, and in step S2402, the HDR image is once converted to a gray image. In step S2403, the gray image is further converted to a logarithmic image. In step S2404, the logarithmic image is separated into a texture image and a sketch image. Specifically, the frequency component of the luminance signal contained in the logarithmic image is separated into a texture component relating to a fine pattern and a component indicating the entire sketch using a frequency filter and the like. The texture image has features of an image extending over a wide dynamic range such as the image imaged in the dynamic range widening photography mode such as the HDR image. The sketch image has features of a fine pattern portion obtained in the image imaged in the resolution enhancing photography mode such as ceramic. Furthermore, holding or tone changing process on the texture image is performed in step S2405-1 for the texture image, and the tone changing process is performed in step S2405-2 for the sketch image. As a result, microscopic concave-convex portions are relatively enhanced when the tone changing process is performed in step S2405-1.

In step S2405-2, the dynamic range of the sketch image is compressed, whereby the brightness of the dark portion becomes relatively larger. The drawing parameter in step S2405-2 becomes a compression rate of the dynamic range of the luminance of the sketch image, and corresponds to "contrast" in the examples of FIGS. 17 and 18. In this regard, contrast represents the compression parameter of the dynamic range.

In step S2406, weighting addition is performed on each image and the separated images are synthesized, whereby the gray image is outputted. The weighting referred to herein is distributed according to whether or not to enhance the texture, how much pixels to saturate, and the like. The drawing parameter in step S2406 corresponds to "texture enhancement degree" in the examples of FIGS. 17 and 18.

The gray image is converted to color image in step S2407. Furthermore, in step S2408, γ correction and color saturation correction are performed on the obtained color image to obtain an output image. The γ correction corresponds to "brightness" in the examples of FIGS. 17 and 18, and the color saturation correction corresponds to "color".

Compression is efficiently performed since the component is separated into the texture component and the sketch component, and different image processing is performed on each component. That is, with respect to the high tone image of dynamic range widening application, a phenomenon in which even the fine concave-convex components get compressed thereby losing the concave-convex feeling is effectively prevented when compressing the luminance distribution. Thus, the drawing setting part speculates whether the user is using the tone conversion function for the purpose of dynamic range widening application or resolution enhancing application, and appropriately sets the drawing parameters from the observed state before photographing, analysis results during photographing of the original image, characteristics of the high tone image, and the like.

(Manual Adjustment of Drawing Parameters)

The user can manually set the drawing parameters independent of the automatic setting. Alternatively, the user can further fine-tune the drawing parameters to optimum drawing parameters after being automatically set by the tone conversion part. The tone conversion console screen 300B of FIG. 18 can be used for fine tuning, as described above.

(Setting Procedure of Drawing Parameters)

Figure 24:
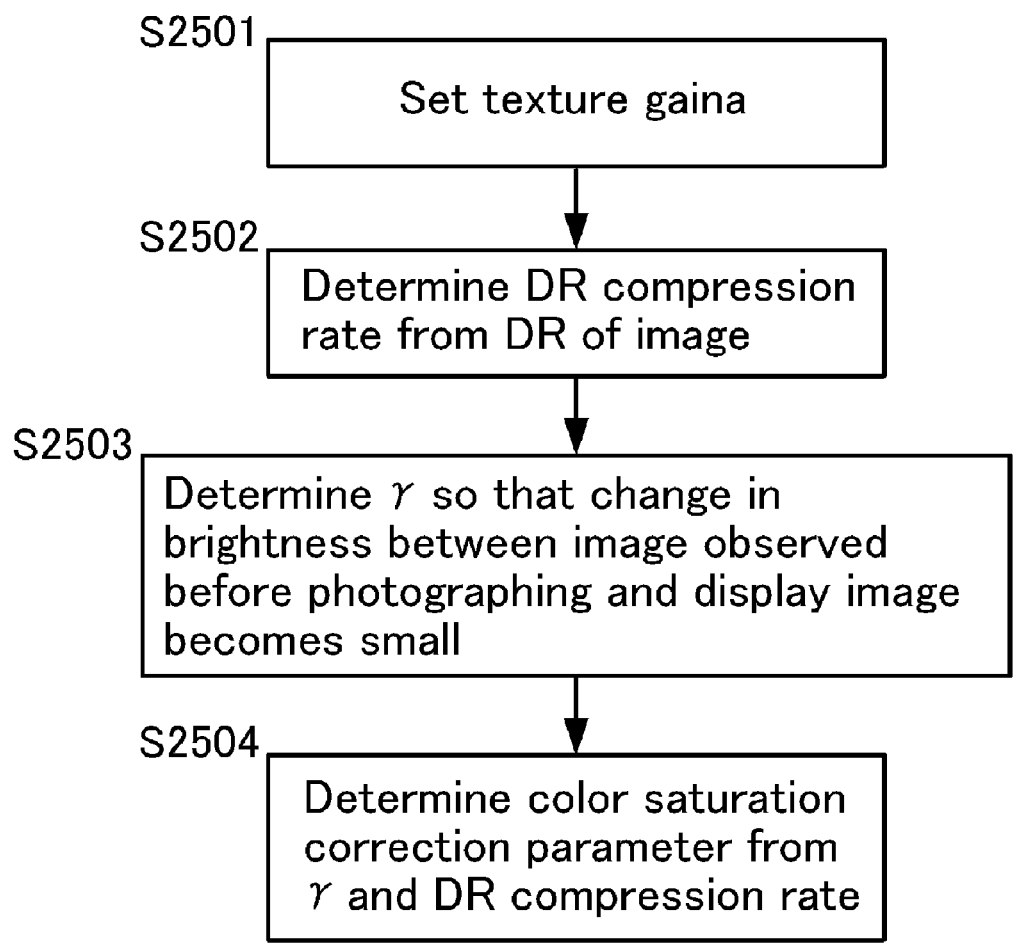
FIG. 24 is a flowchart showing a setting procedure of a specific drawing parameter.

The setting procedures for a specific drawing parameter will now be described with reference to the flowchart of FIG. 24. First, in step S2501, the type of image to be converted is determined, and the texture gain a of the drawing parameter is set based thereon. Specifically, the texture enhancement degree (texture gain a) of the drawing parameters is determined based on at least one of usage purpose of the user determined when photographing the original image or the dynamic range of the high tone image. The texture gain a is set larger the smaller the dynamic range is. The texture gain a is determined from the following equation.

$$\text{Texture gain } a = k \cdot w \ast \log(DR)$$

(k, w: constants, DR: dynamic range of high tone image)

The brightness of the image is then determined. The brightness can be controlled with the contrast and the brightness (γ)

of the drawing parameters. First, in step S2502, the contrast is determined based on the dynamic range of the high tone image. If the dynamic range is large, the contrast is made large. The weighted average of the pixel value weighted so that the weight of the saturated region becomes small is obtained from the observed image before photographing. The weighted pixel value average where the image performed with the process up to the weighting addition of step S2406 is weighted with the weight is obtained based on the gain a and the contrast. In step S2503, γ is determined so that the two weighted pixel value averages become close values, that is, the change in brightness between the observed image before photographing and the display image becomes small.

Lastly, the color saturation correction parameter is obtained based on the γ and the contrast is obtained in step S2504. The color (color saturation correction parameter) is set large since a whitish image without color is obtained as the value of γ in γ y conversion becomes larger.

Such adjustments can be performed automatically or can be performed by the user. In this case, the operation of the plurality of sliders of FIG. 18 corresponding to each parameter can be adjusted while being linked to each other. For instance, the slider is cooperatively operated so that the color becomes larger the larger the γ is. In the example of FIG. 18, adjustment is automatically performed so that the brightness slider 312 and the contrast slider 332 become low since the weight of resolution enhancing application becomes higher as the texture enhancement slider 322 is operated to take a higher value. On the other hand, since the weight of dynamic range widening application becomes higher as the brightness slider 312 takes a higher value, and thus each slider is cooperatively operated and moved so that the texture enhancement slider 322 becomes small and the contrast slider 332 becomes large. In addition, a switching part for turning ON/OFF the slider cooperative operation function may be provided. The drawing parameters such as compression rate and the like can be automatically set according to the dynamic range of the image to be converted or the observation purpose.

(Setting of Weighted Drawing Parameters)

Furthermore, in addition to the configuration of alternatively setting in the drawing setting part 87 the drawing parameters specialized for either the dynamic range widening application or the resolution enhancing application, a configuration of setting the drawing parameters weighted in view of the weight of each application can be adopted. For instance, the observation application is analyzed in the drawing setting part 87, the weighting coefficient for each of the dynamic range widening application and the resolution enhancing application is calculated, and tone conversion is performed in the tone conversion part according to the drawing parameters set accordingly. Thus, the weighting drawing parameters taking the balance between the dynamic range widening application and the resolution enhancing application into consideration can be set without fixing the drawing parameters to either application, whereby more flexible image display and observation can be performed. If the drawing setting part makes a false determination when automatically determining the observation application, the display result reflecting the other observation application to a certain extent can be expected due to the weighting of the drawing parameters.

The weight of both the observation applications is determined and the drawing parameters corresponding thereto are set to calculate the weighting in the drawing setting part. Specifically, the setting of an appropriate drawing parameter is performed according to how high the weight of halation removal is, or how high the weight of contrast enhancement is. For instance, in the dynamic range widening application, the fine texture enhancement is moderately set and setting is made in a direction of suppressing change in brightness of the non-halation portion to enhance the weight of halation removal. On the other hand, in the resolution enhancing application, the fine texture is largely enhanced, and setting is made in a direction of enhancing the contrast even if the image quality or the image tone is slightly changed. According to the directivity of the conditions, the drawing parameters such as the texture enhancement degree can be changed according to the weight of both the observation applications. The criterion for judging the weight of each observation application includes being based on the HDR image, setting of imaging condition during imaging and the like.

(Judgmental Criterion Based on HDR Image)

In the judgment using the HDR image, the ratio between the minimum pixel value and the maximum pixel value of the HDR image, that is, the dynamic range of the HDR image becomes the judgmental criterion. In this method, the texture enhancement degree is moderately set if the dynamic range is large since the ratio of halation removal application increases, and the texture enhancement degree is set large if the dynamic range is small. The luminance distribution of the HDR image also can be used. If the luminance variance is large and the distribution of luminance extends over a wide range, weight of halation removal is estimated to be high.

(Judgmental Criterion Based on Imaging Condition)

In the judgment using imaging condition, the exposure time setting of a camera or an imaging part can be used. That is, the dynamic range of the scene is estimated by performing temporary photographing before the HDR image photographing. The range of the exposure time used in the imaging of the HDR image reflects the dynamic range of the scene. That is, the weight of halation removal is high when the range of exposure time is wide, and the weight of contrast enhancement is high when the range of exposure time is narrow or photographing is performed in a single exposure time.

Therefore, the drawing parameters are set in view of the significance of the observation application on the dynamic range widening application or the resolution enhancing application, and tone conversion is performed in the tone conversion part, so that balanced observation complying with the observation purpose of the user can be carried out.

(High Tone Data-attached Display File)

According to the present embodiment, the file format for saving the synthesized image data may be the saving format in the form of attaching the synthesized image to the tone-converted low tone image. The low tone image data file may be converted to a versatile image format with a user region such as JPEG and TIFF, so that the low tone image data portion can be displayed in the general image display program. Through the use of a dedicated high tone image file creating program, the synthesized image data, which is the original data of the low tone image, can be handled, and the synthesized image data can be distributed while enhancing the readability of the file.

(Saving File Format)

The HDR image data has tones greatly exceeding the eight-bit tone, and thus the original data will be damaged if saved in the same format as the normal eight-bit image. Thus, the data is generally saved in the format performed with sixteen bit, thirty-two bit floating point and other special coding. However, the image display software corresponding to such a special file format is not widely used, and most users cannot browse the HDR image on the normally using image display software. In the magnification observation apparatus according to the present embodiment, the display image is saved in the normal image format of JPEG and TIFF, and the HDR image is saved as the metadata. The user can then use the display image with the normally using image display software.

(Display of High Tone Image)

Figure 25:
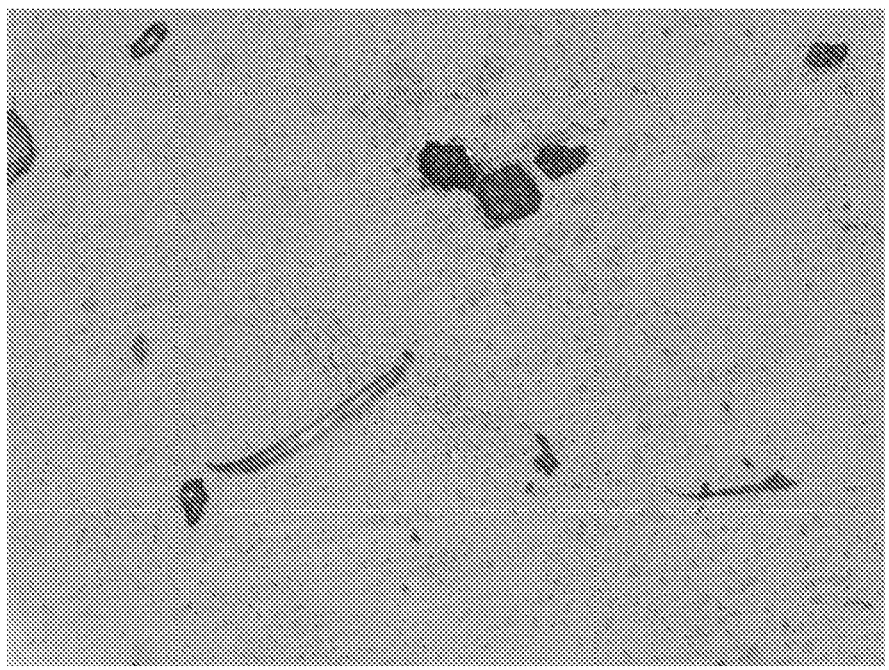
FIG. 25 is an image in one drawing parameter.
Figure 26:
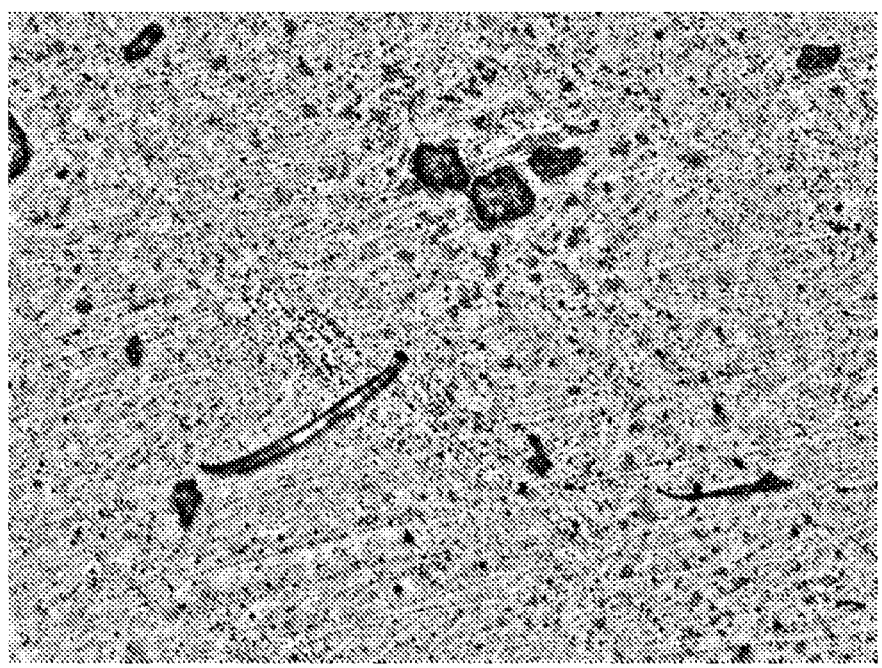
FIG. 26 is an image with which the drawing parameter is changed from FIG. 25.

The brightness, the texture enhancement degree, the color, and the like can be changed by changing the drawing parameters. An example where the drawing parameters are changed is shown in the image of FIGS. 25 and 26. The images shown in such figures are both display images created from the same HDR image. It is apparent that fine textures are enhanced in FIG. 26. Through the use of a dedicated image editing program capable of changing the drawing parameters, the drawing parameters of the HDR image can be changed by reading the metadata. Thus, the user can edit the photographed HDR image in his/her computer to create various display images. Such texture enhancement can be applied to the general eight-bit image, but fine gradation and the like may not be represented since there is a limit in the tone as opposed to the HDR image. Since the HDR image has abundant tones, even fine gradation can be beautifully represented.

The drawing parameters at the time of tone conversion of the low tone image can be recorded in the high tone data-attached display file. Through the use of high tone image file creating program, the drawing parameters used in creating the low tone image can be checked. The user thus does not have to store the drawing parameters by taking notes for every file, and there is obtained a high tone data-attached display file that is extremely easy to use having the information managed in an integrated fashion by the file.

Furthermore, the low tone image newly tone-converted with a different drawing parameter is updated to replace the low tone image data of the high tone data-attached display file. Thus, the readability of the low tone image can be enhanced and retuning of the low tone image also becomes possible by providing the high tone image data serving as the basis for generating the display low tone image data to the display low tone image data.

(Structure of High Tone Data-attached Display File)

Figure 27:
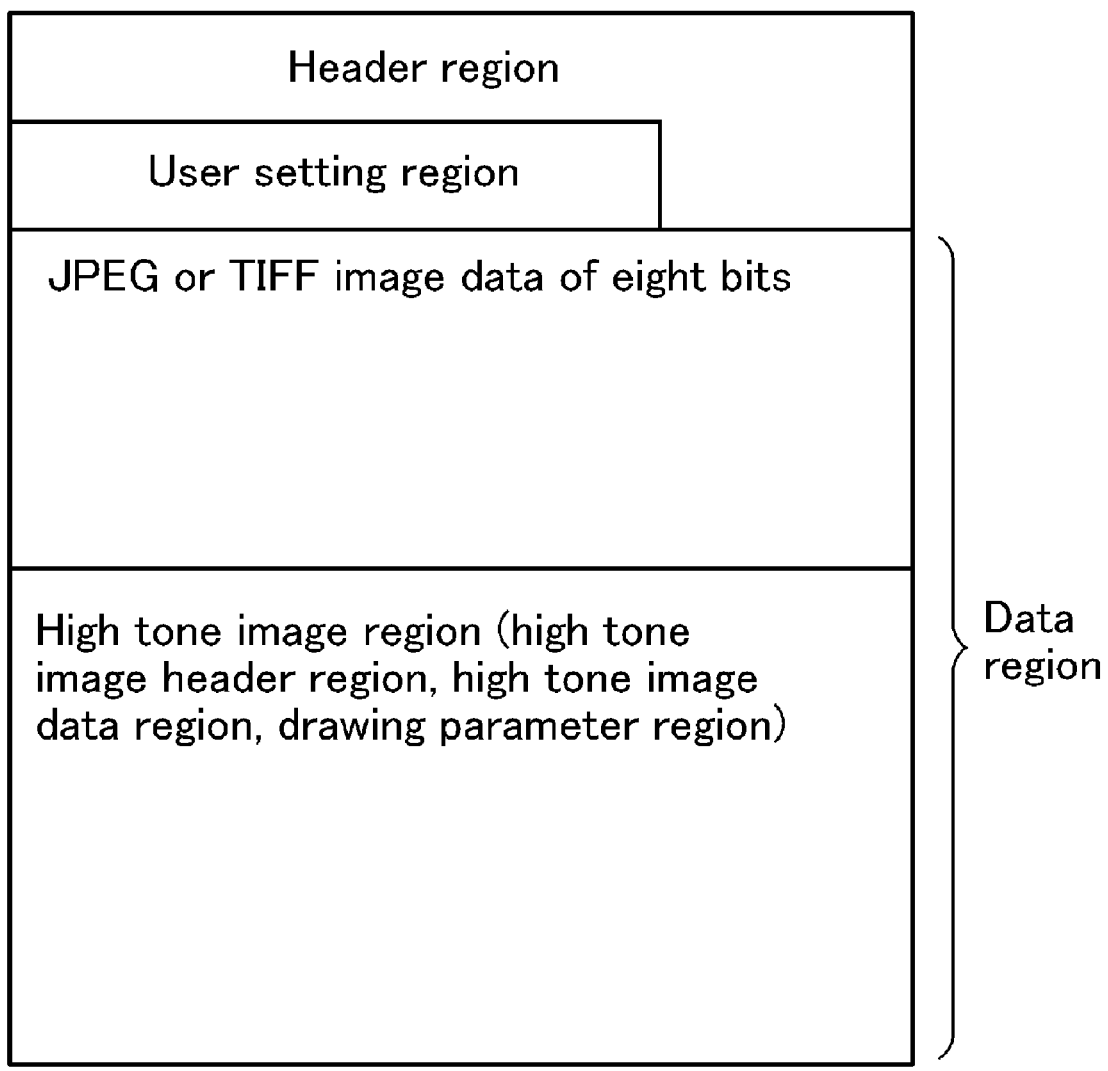
FIG. 27 is a schematic view showing a structure of a high tone data-attached display file.

FIG. 27 shows the structure of high tone data-attached display file. This figure is corresponded to the structure of a general image file such as JPEG and TIFF and includes a header region and a data region. The longitudinal and horizontal widths of the image and the like are generally stored in the header region. A user setting region to which the user can write is normally provided in the header region. A flag indicating the existence of high tone data is inserted to that region. The low tone image is saved as eight-bit data complying with JPEG, TIFF, and the like in the data region. A high tone image region is provided at the tail of the low tone image data as metadata, and the header and the data of the high tone image are recorded therein. Information such as the file size of the synthesized image data is saved in the header region of the high tone image, and the actual data of the synthesized image is saved in the data region of the high tone image. The known thirty-two bit floating point TIFF, logYuv, Open EXR, and the like are appropriately used in the saving format of the actual data. The uncompressed or the lossless compression format can be adopted for the data size. Furthermore, a drawing parameter holding region may be provided in the high tone image region for recording the drawing parameter at the time of tone conversion of the low tone image. The drawing parameter holding region may be provided in the user setting region.

The high tone data-attached display file saves the low tone image data in a versatile image format such as JPEG and TIFF of eight-bit display system when the synthesized image of sixteen bits is tone-converted to a low tone image of eight bits. Since the user setting region that can be set by the user exists in such an image file, information indicating that the synthesized image data is contained and the drawing parameters at the time of tone-converting from the synthesized image to the low tone image can be recorded in that portion. In addition to the file format using the floating point and the like, the synthesized image data can be compressed in data size. Existing methods can be appropriately adopted for the data compression method. When saving the high tone image data to the file, the display image data at the time of displaying the multi-tone data in the conventional eight-bit display system with an appropriate tone conversion method is saved in a general image format such as JPEG and TIFF, and the multi-tone data and the data such as display parameters for creating the display image data from the multi-tone data can be added to the tail of the file, and then saved.

(Extraction and Separation of Texture Component and Sketch Component)

The time necessary for opening the file can be reduced by extracting the texture component when creating the high tone data-attached display file and adding the extracted texture component to the file. Conventionally, when displaying the synthesized image on the monitor and the like, the task of extracting the texture component from the synthesized image is necessary to display the image with the texture enhanced, and thus the processing time becomes long. The calculation amount of the texture extraction can be reduced by separating and saving the texture component in advance in time of file saving, whereby the process from opening the file to displaying the texture processed image becomes high speed or low load. In this case, the file size of the high tone data-attached display file increases due to the attachment of the texture data. The sketch component extracted with the texture component from the synthesized image data is saved, and the sketch component is saved in high data size compression rate, so that increase in file size can be suppressed. In particular, since change in sketch component is generally small, the degradation of image quality is small even if the data size compression rate is increased. Thus, the file can be efficiently saved while increasing the data size compression rate, reducing the file size, and suppressing degradation of image quality.

(Corresponding Pixel Link Function)

The pixels of the low tone image and the synthesized image are linked and an arbitrary pixel on the low tone image is specified, thereby providing a corresponding pixel link function for displaying the pixel value of the synthesized image at the relevant position. The low tone image displayed on the display unit sometimes cannot be displayed with the original color due to tone converting from the synthesized image to the low tone image. The data of the synthesized image corresponding to the point specified on the low tone image can be referenced and the information can be read for display by linking each pixel while corresponding the coordinate position of the low tone image and the synthesized image. For instance, when the user clicks an arbitrary point on the low tone image with the pointing device such as mouse from the screen of FIGS. 19A and 19B and the like, the pixel value on the synthesized image corresponding to the relevant position is read, and information on the pixel value or the coordinate position thereof are displayed on the display unit. Two arbitrary points can be specified on the low tone image, and the chromaticity difference can be calculated from the corresponding position of the synthesized image and displayed. Such corresponding pixel link function is realized by functioning the image calculating unit 81 as the corresponding pixel link part. The slight change and the like in color that cannot be distinguished from the screen of the display unit can be recognized by associating the HDR image and the LDR image in such manner.

(Procedures for Creating and Saving the High Tone Data-attached Display File)

The procedures for creating and saving the high tone data-attached display file will now be described. First, the synthesized image data in which a plurality of original images is synthesized is built and saved as necessary. In building the data, the texture component is extracted from the synthesized image.

The drawing process for displaying the synthesized image as a low tone image will now be described. The drawing parameter in this case is automatically set in the high tone image file creating program. Alternatively, the user may set the drawing parameter or may fine tune the automatically set value. The versatile image format such as JPEG and TIFF can be used as the file format of the drawing processed image data. Since the user setting region that can be used by the user exists in the image file, the flag data indicating the presence of the high tone image data, coupled region address of the high tone image data, and the size of the high tone image data are written to the relevant region. Furthermore, the low tone image file coupled with the high tone image data is created in the specified region in the data region. The drawing parameters are also saved in the drawing parameter holding region provided in the high tone image region. The instruction of specific saving is performed by pushing the "JPEG save" button 364 provided at the lower part of the tone conversion console screens 300, 300B of FIGS. 17 and 18 as one form of the tone data saving part. The "save as" dialogue is displayed when the "JPEG save" button 364 is pushed, so that the user can specify the desired file name and specify the saving format. The TIFF may be selected other than the JPEG for the file format. When saving only the synthesized image, thirty-two bit floating point TIFF, logYuv, Open EXR, and the like can be specified. Alternatively, JPEG, TIFF, BMP, and the like can be specified when displaying only the tone mapping image.

The high tone data-attached display file created in this manner can display the low tone image data portion with a general image display program. The high tone image data-attached to the end of the high tone data-attached display file can be displayed by using a dedicated high tone image file creating program. When the "JPEG read" button 362 is pushed from the tone conversion console screens 300, 300B of FIGS. 17 and 18, the file select dialogue is displayed, so that the user can specify the desired file. When opening the high tone data-attached display file with the high tone image file creating program, the coupling flag of the high tone image data is first checked. In the case of an image file coupled with the high tone image data, the high tone image data is read, the drawing parameters saved in the drawing parameter holding region are read, and the drawing process is performed according to the drawing parameters, and then displayed.

The user can reset the drawing parameters to change the low tone image in this state, where the old low tone image can be replaced and saved as the changed new low tone image during file saving. When updating the low tone image of the high tone data-attached display file, the drawing parameters of the drawing parameter holding region can be updated when updating the low tone image of the high tone data-attached display file. The coupling of the high tone image data can be released to separate the synthesized image and the low tone image, or the separated synthesized image and the low tone image can be coupled.

Since the file format of the high tone image of the conventional HDR and the like is not versatile, it cannot be displayed in most of the normal image display programs, but it is suitable for distribution of high tone image as at least the low tone image can be easily displayed with the relevant method and the content of the data can be understood. The high tone image data can be handled through the use of the high tone image file creating program, and both versatility and specialty of the file can be satisfied. In particular, the low tone image in which the drawing parameters are adjusted can be replaced using the high tone image file creating program. The drawback in that the file size of the high tone data-attached display file becomes large by adding the high tone image data of large file size can be suppressed by adding the data while compressing the data size of the synthesized image data.

(Acquisition, Display, and Saving of Synthesized Image)

Figure 28:
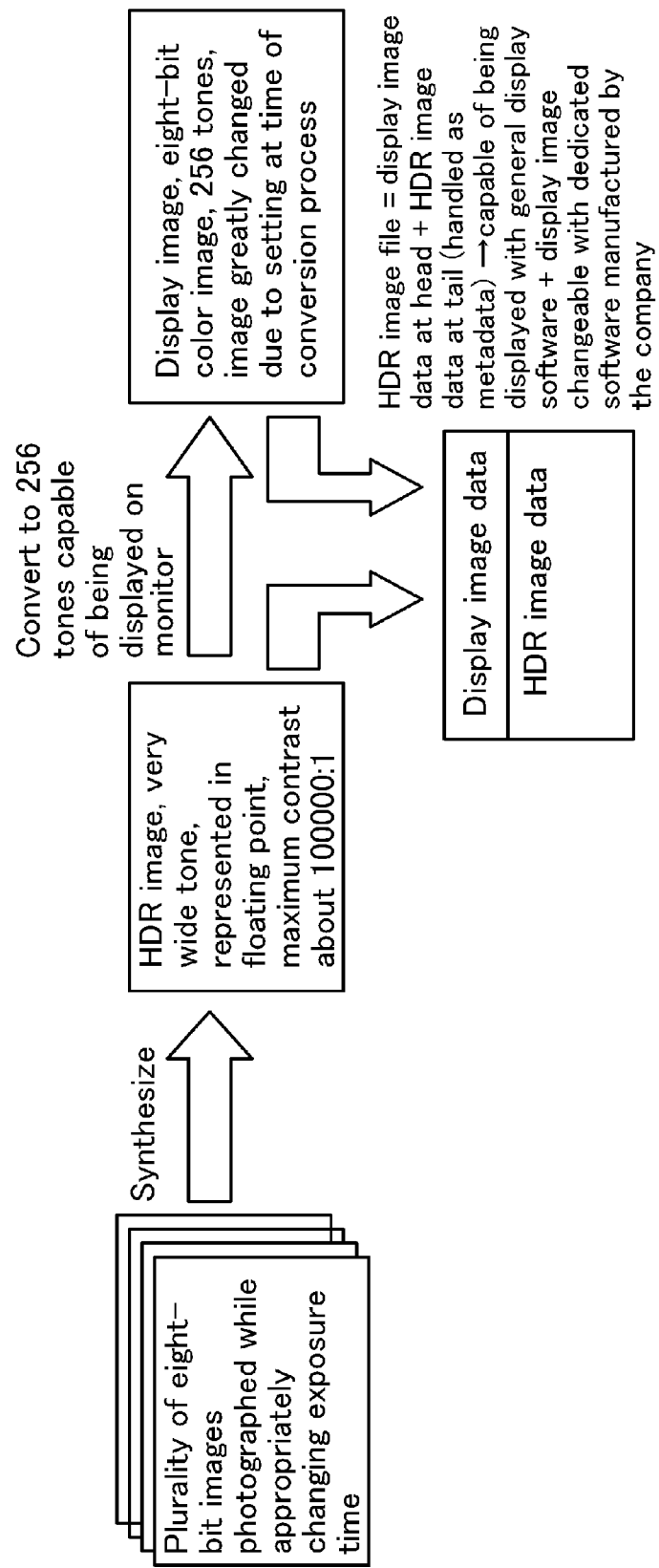
FIG. 28 is a block diagram showing a flow of acquisition and display, and data saving of a synthesized image using a magnification observation apparatus according to the embodiments.

The flow of acquisition and display, and data saving of the synthesized image using the magnification observation apparatus according to the present embodiment is shown in FIG. 28. As shown in the figure, a plurality of eight bit images photographed while appropriately changing the exposure time are synthesized, thereby generating the HDR image, which is the high tone image. The HDR image has a very wide range of tones, and the ratio of the maximum contrast and the minimum contrast is about 10000:1. The HDR image is recorded using the floating point. When displaying the HDR image on the display unit 52 such as a monitor, tone conversion (tone mapping) to the tone mapping image data of eight bits (265 tones) and the like that can be displayed on the display unit 52 is performed. The high tone HDR image thus can be displayed as the eight bit color image even on the display unit having limited dynamic range. The tone mapping image greatly changes due to the drawing parameter setting in time of tone conversion process.

(Embedded Image File Saving)

The HDR image data and the tone mapping image data are respectively saved in a predetermined format, but the tone mapping image data can be saved with the HDR image embedded therein. The embedded image file records tone mapping image data at the head and the HDR image data at the end. The HDR image data is handled as metadata. This file may be a versatile image format, and the tone mapping image data can be displayed with the general image display program. Through the use of the dedicated software capable of handling the tone mapping image data, the tone mapping image data can be newly generated from the HDR image, and the tone mapping image data can be updated. Thus, use as the HDR image can be achieved while maintaining the handiness of the image. In particular, the drawing parameters can be set and replaced so that the image of user preference is obtained.

The magnification observation apparatus, the high tone image file creating method, and the high tone image file creating method of the present invention generate and enable browsing of the HDR image using microscope, reflective type or transmissive type digital microscope, and digital camera.

What is claimed is:

1. A magnification observation apparatus capable of displaying an image obtained by imaging a sample to be imaged according to a set imaging condition, the magnification observation apparatus comprising:
    an imaging condition setting part that sets at least an exposure time as the imaging condition when imaging an original image in an imaging unit;
    the imaging unit that images the original image having a predetermined dynamic range, which is a ratio between minimum luminance and maximum luminance, according to the imaging condition set in the imaging condition setting part with respect to an observation position of the sample;

a synthesized image generating part that generates synthesized image data that is higher in tone than a tone width of the original image by synthesizing a plurality of original images imaged under different imaging conditions at the same observation position;

a display unit that displays the images imaged by the imaging unit;

a tone conversion part that converts the synthesized image data generated in the synthesized image generating part to low tone image data having a tone width capable of being displayed on the display unit; and a tone data saving part that saves the low tone image data in a data region of a versatile image file, provides a high tone image region in the versatile image file to save the synthesized image data serving as a basis and saves a high tone data-attached display file including the synthesized image data in the high tone image region as metadata; and an image editing part that edits the synthesized image data by reading the metadata saved in the tone data saving part.

2. The magnification observation apparatus according to claim 1, wherein a drawing parameter holding region in which a drawing parameter in performing tone-conversion from the synthesized image to the low tone image is recorded is provided in the high tone data-attached display file generated by the tone data saving part.

3. The magnification observation apparatus according to claim 2, wherein the tone data saving part is configured to change the drawing parameter read out from the drawing parameter holding region with respect to the already-saved low tone image and update the low tone image already saved with the synthesized image to a new low tone image when performing tone conversion from the synthesized image to the new low tone image.

4. The magnification observation apparatus according to claim 1, wherein the tone data saving part saves the synthesized image data added to the low tone image file with a data size of the synthesized image data compressed.

5. The magnification observation apparatus according to claim 1, wherein the tone data saving part saves the synthesized image data added to the low tone image file with the synthesized image data separated into a texture component and a sketch component.

6. The magnification observation apparatus according to claim 5, wherein the tone data saving part adds the sketch component extracted from the synthesized image data to the low tone image file with at least a data size compressed to save the file.

7. The magnification observation apparatus according to claim 5, wherein the tone data saving part resets, as the drawing parameter, at least one of a gain with respect to the texture component and a data size compression rate with respect to the sketch component.

8. The magnification observation apparatus according to claim 1, wherein a high tone data-attached display file format generated by the tone data saving part is a versatile image file format.

9. The magnification observation apparatus according to claim 1, wherein the high tone data-attached display file has a header region and the data region and a flag indicating existence of the high tone data being inserted to the header region.

10. A magnification observation apparatus capable of tone-converting a high tone image having a tone width greater than or equal to a tone capable of being displayed on a display unit to a low tone image, and of displaying the image, the magnification observation apparatus comprising:

the display unit that displays the low tone image;

a tone conversion part that tone-converts the high tone image to low tone image data having a tone width capable of being displayed on the display unit; and a tone data saving part that saves the low tone image data in a data region of a versatile image file, provides a high tone image region in the versatile image file to save the synthesized image data serving as a basis and saves a high tone data-attached display file including the synthesized image data in the high tone image region as metadata; and an image editing part that edits the synthesized image data by reading the metadata saved in the tone data saving part.

11. The magnification observation apparatus according to claim 1, further comprising a corresponding pixel link part that specifies a point on the low tone image displayed on the display unit and reads out and displays a pixel value at a position on the synthesized image corresponding to the point.

12. The magnification observation apparatus according to claim 10, wherein the high tone data-attached display file has a header region and the data region and a flag indicating existence of the high tone data being inserted to the header region.

13. A method for creating a high tone image file for saving high tone image data having a tone width greater than or equal to a tone capable of being displayed on a display unit, the method comprising the steps of:

setting at least an exposure time as an imaging condition when imaging an original image in an imaging unit;

imaging a plurality of original images having a predetermined dynamic range, which is a ratio between minimum luminance and maximum luminance, under different exposure conditions at the same observation position according to the set imaging condition with respect to an observation position of a sample;

generating a synthesized image that is higher in tone than the image capable of being displayed on the display unit by synthesizing the plurality of original images;

tone-converting the generated synthesized image to low tone image data having a tone width capable of being displayed on the display unit; and generating a tone data saving part that saves the low tone image data in a data region of a versatile image file, provides a high tone image region in the versatile image file to save the synthesized image data serving as a basis and saves a high tone data-attached display file including the synthesized image data in the high tone image region as metadata; and image editing the synthesized image data by reading the metadata saved in the tone data saving part.

14. The method according to claim 13, wherein the high tone data-attached display file has a header region and the data region and a flag indicating existence of the high tone data being inserted to the header region.

15. A method for creating a high tone image file for saving high tone image data having a tone width greater than or equal to a tone capable of being displayed on a display unit, the method comprising the steps of:

setting at least an exposure time as an imaging condition when imaging an original image in an imaging unit;

imaging a plurality of original images having a predetermined dynamic range, which is a ratio between minimum luminance and maximum luminance, under different exposure conditions at the same observation position according to the set imaging condition with respect to an observation position of a sample;

generating a synthesized image that is higher in tone than the image capable of being displayed on the display unit by synthesizing the plurality of original images;

tone-converting the generated synthesized image to low tone image data having a tone width capable of being displayed on the display unit according to a predetermined drawing parameter; and generating a tone data saving part that saves the low tone image data in a data region of a versatile image file, provides a high tone image region in the versatile image file to save the synthesized image data serving as a basis and saves a high tone data-attached display file including the synthesized image data in the high tone image region as metadata; and image editing the synthesized image data by reading the metadata saved in the tone data saving part.

16. The method for creating a high tone image file according to claim 15, wherein, with respect to the already generated high tone data-attached display file, the drawing parameter read out from the high tone data-attached display file is changed, tone conversion is performed from the synthesized image to a new low tone image, and update to a high tone data-attached display file in which the already saved low tone image is replaced with the new low tone image is performed.

17. The method according to claim 15, wherein the high tone data-attached display file has a header region and the data region and a flag indicating existence of the high tone data being inserted to the header region.

* * * * *